(12) United States Patent
Bar Eliyahu et al.

(10) Patent No.: US 11,842,155 B1
(45) Date of Patent: Dec. 12, 2023

(54) ENSEMBLE MODEL FOR ENTITY RESOLUTION IN MATCHING PROBLEMS USING CLASSIFICATION, SUBAREA, NLP AND SUBAREA NLP MACHINE LEARNING MODELS

(71) Applicant: Intuit Inc., Mountain View, CA (US)

(72) Inventors: Natalie Bar Eliyahu, Azor (IL); Noga Noff, Pardes-Hanna (IL); Omer Wosner, Naale (IL); Yair Horesh, Kfar-Saba (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/990,852

(22) Filed: Nov. 21, 2022

(51) Int. Cl.
*G06F 40/295* (2020.01)
*G06N 20/20* (2019.01)
*G06N 20/00* (2019.01)
*G06N 3/045* (2023.01)

(52) U.S. Cl.
CPC ........... *G06F 40/295* (2020.01); *G06N 20/20* (2019.01); *G06N 3/045* (2023.01); *G06N 20/00* (2019.01)

(58) Field of Classification Search
CPC ...... G06F 40/295; G06N 20/20; G06N 3/045; G06N 20/00
See application file for complete search history.

(56) References Cited

U.S. PATENT DOCUMENTS

2020/0356895 A1* 11/2020 Ong .................. G06N 20/00
2021/0287129 A1* 9/2021 Saito ................. G06N 3/045

OTHER PUBLICATIONS

Li et al., "Deep Entity Matching with Pre-Trained Language Models," Proceedings of the VLDB Endowment, arXiv:2004.00584v3 [cs.DB] Sep. 2, 2020 (Year: 2020).

* cited by examiner

*Primary Examiner* — Farzad Kazeminezhad
(74) *Attorney, Agent, or Firm* — Paradice & Li LLP

(57) ABSTRACT

Systems and methods for matching entities to target objects using an ensemble model are disclosed. The ensemble model includes a general trained machine learning (ML) model (which is trained using the entirety of a training dataset) and a subarea trained ML model (which is trained using a subset of the training dataset corresponding to a specific, defined subarea) that provides potential matches to a meta-model of the ensemble model to generate a final match. The ensemble model may also include a general trained natural language processing (NLP) model and a subarea trained NLP model that provides potential matches to the meta-model. The meta-model of a quad-ensemble ML model combines the four potential matches (such as probabilities and similarities of matching specific pairs of targets objects and entities) to generate a final match (such as a final probability used to identify the final match).

18 Claims, 10 Drawing Sheets

600

```
┌─────────────────────────────────────────────────────────────────────────┐
│ For each entity, generate, by the general trained classification model, │
│ a first probability of the entity matching the target object. 602       │
└─────────────────────────────────────────────────────────────────────────┘
                                      ▼
┌─────────────────────────────────────────────────────────────────────────┐
│ For each entity, generate, by the subarea trained classification model, │
│ a second probability of the entity matching the target object. 604      │
└─────────────────────────────────────────────────────────────────────────┘
                                      ▼
┌─────────────────────────────────────────────────────────────────────────┐
│ For each entity, generate, by the general trained NLP model, a first    │
│ similarity associated with the entity matching the target object. 606   │
└─────────────────────────────────────────────────────────────────────────┘
                                      ▼
┌─────────────────────────────────────────────────────────────────────────┐
│ For each entity, generate, by the subarea trained NLP model, a second   │
│ similarity associated with the entity matching the target object. 608   │
└─────────────────────────────────────────────────────────────────────────┘
                                      ▼
┌─────────────────────────────────────────────────────────────────────────┐
│ For each entity, provide the first probability, the second probability, │
│ the first similarity, and the second similarity to the meta-model. 610  │
└─────────────────────────────────────────────────────────────────────────┘
                                      ▼
┌─────────────────────────────────────────────────────────────────────────┐
│ For each entity, generate, by the meta-model, a final probability of    │
│ the entity matching the target object. 612                              │
│ ┌─────────────────────────────────────────────────────────────────────┐ │
│ │ Combine, by the meta-model, the first probability, the second      │ │
│ │ probability, the first similarity, and the second similarity       │ │
│ │ associated with the entity to generate the final probability       │ │
│ │ associated with the entity. 614                                    │ │
│ └─────────────────────────────────────────────────────────────────────┘ │
└─────────────────────────────────────────────────────────────────────────┘
                                      ▼
┌─────────────────────────────────────────────────────────────────────────┐
│ Compare the final probabilities associated with the plurality of        │
│ entities. 616                                                           │
└─────────────────────────────────────────────────────────────────────────┘
                                      ▼
┌─────────────────────────────────────────────────────────────────────────┐
│ Generate a final match of a matched entity to the target object based   │
│ on the comparison. 618                                                  │
└─────────────────────────────────────────────────────────────────────────┘
```

Figure 6

| description ←702 | memo ←704 |
|---|---|
| US TREASURY DES: PAYMENT CHECK #:XXX INDN:PUSBXXXXXXXXX CO ID:XXXXXXXXXX ARC | US TREASURY DES: PAYMENT CHECK #:XXX INDN:PUSBXXXXXXXXX CO ID:XXXXXXXXXX ARC |
| Zelle Transfer Conf# XXXXXXXXX; Doe, John | Zelle Transfer Conf# XXXXXXXXX; Doe, John |
| Debit Card Txn POS Purchase Terminal XXXXXX JUPITER MARATHON JUPITER FL48027 XXXXXXX 03-02-22 7:45 PM | Debit Card Txn POS Purchase Terminal XXXXXX JUPITER MARATHON JUPITER FL48027 XXXXXXX 03-02-22 7:45 PM |
| JOHN6945ATDOE OTTUMWA IA | JOHN6945ATDOE OTTUMWA IA |
| SQ *STUMPTOWN COFFEE ROAS | SQ *STUMPTOWN COFFEE ROAS |
| ADP Tax ADP Tax IDXXXXXXXXXX | ADP Tax ADP Tax IDXXXXXXXXXX |
| VENDOR PAY US FOODSERVICE | VENDOR PAY US FOODSERVICE [weekly food delivery for office] ←706 |
| ... | |

| Vendor | Industry |
|---|---|
| Vendor 1 | Industry A |
| Vendor 2 | Industry B |
| Vendor 3 | Industry C |
| Vendor 4 | Industry B |
| Vendor 5 | Industry A |
| Vendor 6 | Industry A |
| Vendor 7 | Industry C |
| Vendor 8 | Industry A |
| Vendor 9 | Industry B |

```
Obtain financial transactions for all vendors for a time period. 902
                              ↓
Calculate, for each financial transaction, the numeric features to be provided to a
              classification model for training. 904
                              ↓
Train the classification model using the calculated numeric features for all of the financial
      transactions to generate the general trained classification model. 906
```

```
Obtain financial transactions for all vendors of industry x for a time period. 1002
                              ↓
Calculate, for each financial transaction, the numeric features to be provided to a
              classification model for training. 1004
                              ↓
Train the classification model using the calculated numeric features for the financial
transactions for industry x to generate the industry x trained classification model. 1006
```

Figure 10

ENSEMBLE MODEL FOR ENTITY RESOLUTION IN MATCHING PROBLEMS USING CLASSIFICATION, SUBAREA, NLP AND SUBAREA NLP MACHINE LEARNING MODELS

TECHNICAL FIELD

This disclosure relates generally to the implementation and use of an ensemble model to resolve matching problems of entities to target objects, including the implementation and use of a quad-ensemble model to resolve such matching problems.

DESCRIPTION OF RELATED ART

Various matching problems exist for large collections of datasets. For example, various genetic sequences that are observed may be matched with human conditions. In another example, dating services may use user profile features to match a user profile to a target user profile. As datasets and the number of features grow to sizes that cannot be handled practically in the human mind or using pen and paper, there is a larger reliance on computer implemented solutions to solve such problems. For example, in the above example matching problems, a computer may be configured to implement a defined set of matching rules to resolve entities (such as the human condition or a matching user profile) to a target (such as a specific genetic sequence or a target user profile).

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a computer-implemented method for matching entities to target objects. The method includes obtaining a target object for matching with one of a plurality of entities, providing the target object to a general trained machine learning (ML) model of a trained ensemble ML model, and generating, by the general trained ML model, a general based match between the target object and a first one or more entities from the plurality of entities based on the target object. The method also includes providing the target object to a subarea trained ML model of the trained ensemble ML model and generating, by the subarea trained ML model, a subarea based match between the target object and a second one or more entities from the plurality of entities based on the target object. The method further includes providing, to a meta-model of the trained ensemble ML model, the general based match and the subarea based match and generating, by the meta-model, a final match between the target object and a final entity from the plurality of entities. Generating the final match is based on combining the general based match and the subarea based match.

Another innovative aspect of the subject matter described in this disclosure can be implemented in a system for matching entities to target objects. An example system includes one or more processors and a memory storing instructions that, when executed by the one or more processors, cause the system to perform operations. The operations include obtaining a target object for matching with one of a plurality of entities, providing the target object to a general trained ML model of a trained ensemble ML model, and generating, by the general trained ML model, a general based match between the target object and a first one or more entities from the plurality of entities based on the target object. The operations also include providing the target object to a subarea trained ML model of the trained ensemble ML model and generating, by the subarea trained ML model, a subarea based match between the target object and a second one or more entities from the plurality of entities based on the target object. The operations further include providing, to a meta-model of the trained ensemble ML model, the general based match and the subarea based match and generating, by the meta-model, a final match between the target object and a final entity from the plurality of entities. Generating the final match is based on combining the general based match and the subarea based match.

In some implementations, a system performing the above method or operations also performs: providing the target object to a general trained natural language processor (NLP) model (with the general trained ML model being a general trained classification model to generate a general classification based match); generating, by the general trained NLP model, a general NLP based match between the target object and a third one or more entities from the plurality of entities based on the target object; providing the target object to a subarea trained natural language processor (NLP) model (with the subarea trained ML model being a subarea trained classification model to generate a subarea classification based match); generating, by the subarea trained NLP model, a subarea NLP based match between the target object and a fourth one or more entities from the plurality of entities based on the target object; and providing, to the meta-model, the general NLP based match and the subarea NLP based match. In this manner, generating the final match is based on combining the general classification based match, the subarea classification based match, the general NLP based match, and the subarea NLP based match.

Through the use of an ensemble ML model (and particularly a quad-ensemble ML model that includes four different types of ML models) to generate potential matches or probabilities and similarities that may be used to generate a final match, matching target objects and entities is improved compared to traditional ML models or other means. For example, a quad-ensemble ML model that includes general trained and subarea trained models allows the ensemble ML model to leverage accuracies from both general trained models and subarea trained models for different data to be matched. In addition, a quad-ensemble ML model that includes classification models and NLP models allows the ensemble ML model to leverage accuracies from both classification models and NLP models for different data to be matched. As such, such a quad-ensemble ML model improves matching between target objects and entities.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 6 shows an illustrative flow chart depicting an example operation of a trained ensemble ML model for matching an entity to a target object based on probabilities and similarities generated for different potential entity and target object pairs, according to some implementations.

FIG. 7 shows example texts for processing by a natural language processing (NLP) model.

FIG. 8 shows an example list of vendors and associated industries stored in memory, according to some implementations.

FIG. 9 shows an illustrative flow chart depicting an example operation of training a general classification model, according to some implementations.

FIG. 10 shows an illustrative flow chart depicting an example operation of training a subarea classification model, according to some implementations.

Like numbers reference like elements throughout the drawings and specification.

DETAILED DESCRIPTION

Figure 1:
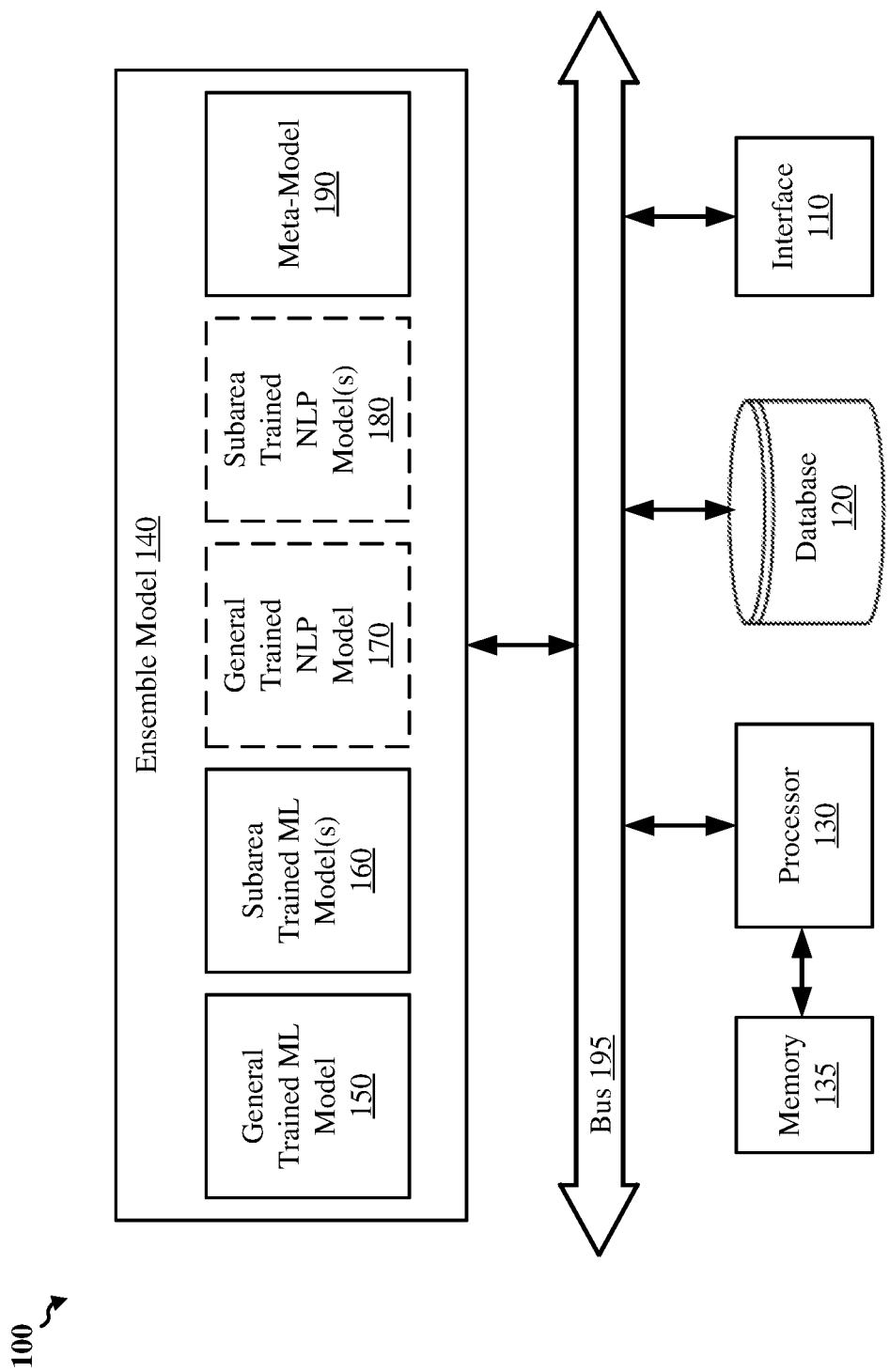
FIG. 1 shows an example system for matching entities to target objects, according to some implementations.

Implementations of the subject matter described in this disclosure may be used for the implementation and use of an ensemble model to resolve matching problems of entities to target objects. In particular, systems and methods are described regarding the implementation and use of a quad-ensemble machine learning (ML) model to resolve such matching problems.

As used herein, a "target object" (or "target") refers to an object that is to have an entity matched to it, and an "entity" refers to an object that may be matched to a target object. Example objects for various matching problems include genetic sequences and human conditions (for matching human conditions to sequences), dating profiles (for matching profiles to one another), delivery drivers and packages to be delivered (for matching packages to drivers), taxi or car shuttle drivers and pick up requests, a temporary staffing company's employees and jobs to be filled, data records and companies (for matching a data record to a company), and so on. ML models are used to attempt to generate better solutions to matching problems than rule based or strict algorithmic approaches. For example, a computing system may have implemented any of a variety of trained ML models for matching, such as fuzzy matching or any of a variety of classification models, to match entities to targets.

Some matching problems have different subareas for which the importance of features for matching may differ. For example, in matching genetic sequences to human conditions, one study in a first subarea may be interested in matching genetic sequences with specific facial features while another study in a second subarea may be interested in matching genetic sequences with potential diseases. In another example, in matching online dating profiles that is location based (such as users within 50 miles of each other), profile features that are of importance in one part of a country or the world (which may be considered a first subarea) may have less importance in other parts of the country or the world (which may be considered other subareas).

One problem with a traditional ML model for matching is that if an ML model is trained to perform matching in general without reference to specific subareas of the matching problem, the accuracy of the ML model may differ based on the subarea of the matching problem to which it is applied. To attempt to compensate for the above problem, an ML model may be trained for a specific subarea of the matching problem. One problem with such specific training of an ML model into subareas is that the ML model may miss correlations of features or other improvements that are only apparent in the overall dataset for which a generally trained ML model would capture. As such, a subarea trained ML model may sometimes be less accurate than a general trained ML model or at the least does not capture the benefits of a general trained ML model.

Another problem with a traditional ML model for matching is that the ML model may be accurate for specific types of data provided to the model. For example, a classification model that relies on numeric data as input is unable to parse natural language associated with any numeric data. Conversely, a natural language processor (NLP) model (also referred to simply as an NLP) may be able to provide context regarding the natural language, but the NLP is unable to handle numeric data as accurately as the classification model. Regarding the online dating profile matching example above, a classification model based on the numeric data may be able to generate matches based on height, eye color, or other specific numerically represented characteristics regarding the users, but the classification model is less able to parse write-ups about the person. Conversely, an NLP can assist in matching based on parsing the write-ups for each profile, but the NLP is less able to match profiles based on the above numeric data. As such, each type of traditional model on its own may be deficient in matching based on some types of input data.

As such, there is a need to implement an ML model that is able to combine the benefits of a generally trained ML model with a subarea trained ML model. In addition, there is also a need to implement an ML model that is able to combine the benefits of a numeric based classification model with an NLP for various matching problems.

Various implementations of the subject matter disclosed herein provide one or more technical solutions to technical matching problem. In some implementations, a computing system is configured to obtain a target object for matching with one of a plurality of entities, provide the target object to a general trained ML model (such as a general classification model) of a trained ensemble ML model, and provide the target object to a subarea trained ML model (such as a subarea classification model) of the trained ensemble ML model. The computing system is also configured to generate, by the general trained ML model, a general based match between the target object and a first one or more entities from the plurality of entities based on the target object and generate, by the subarea trained ML model, a subarea based match between the target object and a second one or more entities from the plurality of entities based on the target object. The computing system is further configured to provide, to a meta-model of the trained ensemble ML model, the general based match and the subarea based match and generate, by the meta-model, a final match between the target object and a final entity from the plurality of entities. Generating the final match is based on combining the general based match and the subarea based match.

The computing system may also be configured to provide the target object to a general trained NLP model of the trained ensemble ML model and provide the target object to a subarea trained NLP model of the trained ensemble ML model, with the computing system also configured to generate, by the general trained NLP model, a general NLP based match between the target object and a third one or more entities and generate, by the subarea trained NLP model, a subarea NLP based match between the target object and a fourth one or more entities. As such, the meta-model may generate a final match based on combining the general classification based match, the subarea classification based match, the general NLP based match, and the subarea NLP based match. In this manner, a quad-ensemble model is able to leverage the advantages of NLP models, classification models, general trained ML models, and subarea trained ML models to improve the matching results.

Various aspects of the present disclosure provide a unique computing solution to a unique computing problem that did not exist prior to the creation of machine learning models. In addition, the use of such machine learning models allows the optimized matching of hundreds of thousands, or even millions, of target objects with hundreds or thousands of entities. Such an immense number of potential matches (which may be in the millions or approach the billions) cannot be performed in the human mind, much less using pen and paper. In addition, such machine learning technology as described herein cannot be performed in the human mind, much less using pen and paper. As such, implementations of the subject matter disclosed herein are not an abstract idea such as organizing human activity or a mental process that can be performed in the human mind.

FIG. 1 shows an example system 100 for matching entities to target objects, according to some implementations. The system 100 includes an interface 110, a database 120, a processor 130, a memory 135 coupled to the processor 130, and an ensemble ML model 140 (which may also be referred to as an ensemble model). In some implementations, the various components of the system 100 may be interconnected by at least a data bus 195, as depicted in the example of FIG. 1. In other implementations, the various components of the system 100 may be interconnected using other suitable signal routing resources.

The system 100 is configured to solve matching problems of entities to target objects using the ensemble model 140. As noted above, target objects may be any suitable objects to be matched (such as online dating profiles, mapped genetic sequences, data records, etc.), and entities to be matched may be other suitable objects for matching (such as potential matching online dating profiles, facial features or other human characteristics to be matched with genetic sequences, companies or employees corresponding to the data records, etc.).

In some implementations, the computing system 100 is configured to solve the matching problem of vendors to financial transactions. An online or otherwise computer-implemented bookkeeping application may be used by a business (or other entity) to manage financial transactions of money into and out of the business. For example, Intuit® QuickBooks® Online (QBO) is an online financial bookkeeping platform to allow a business to link financial accounts (such as bank accounts, credit card accounts, etc.) from financial institutions so that QBO may manage and present the financial activity of the business to a user.

Each business works with one or more vendors that provides goods or services to the business. For example, a bakery may have a food vendor to provide baking products (such as milk, eggs, etc.), a telecommunication provider to provide internet and phone service, an electric utility to provide electricity, a landlord to provide rental space for the bakery, a plumber on contract to provide emergency plumbing services, and so on. When the business needs or wants goods or services from a vendor, the business may generate a purchase order (PO) to be provided to the vendor for the specific goods or services.

QBO may generate POs or may obtain POs generated outside of QBO. For example, for a weekly food delivery order, QBO may be used to generate a PO to the food vendor. In addition, QBO may obtain financial transaction information (referred to herein as financial transactions) from linked financial accounts from one or more financial institutions. For example, QBO may interface with a banking website to obtain a bank account transaction report for the last month, or the bank may provide a push notification received by QBO of any new transactions. As such, QBO may be used to organize POs and financial transactions for bookkeeping purposes.

In organizing POs and financial transactions, QBO may be able to show various metrics, such as money spent with a specific vendor, money spent on specific services, areas of spend, outstanding POs, expected expenses, or other information regarding financial operations of the business, which may allow an accountant, owner, analyst, or other user for the business to understand the financial operations and landscape for the business. For example, a business owner reviewing last month's expenses in QBO may select a vendor in order to see how much money was spent with the vendor during the last month. For bookkeeping purposes, a bookkeeping application may generate a money-out transaction in the business' ledger corresponding to the financial transaction matched with a vendor.

However, in order to be able to organize financial transactions, vendors may need to be linked to financial transactions. For example, when a new financial transaction is received, the financial transaction may be linked to a specific vendor. Typically, a bookkeeping application requires a user to manually select a vendor from a list of vendors in order to match the vendor to the financial transaction. Requiring a user to manually match vendors to financial transactions, though, may be practically impossible (such as if the number of transactions are in the hundreds or thousands as the business grows). In addition, a user manually matching vendors to financial transactions may lead to human error (such as if the user cannot remember specific financial transactions or other information to properly match a vendor to a financial transaction).

In some implementations, the computing system 100 is configured to use the ensemble model 140 to solve the problem of matching vendors (which is an example of entities) to financial transactions (which is an example of target objects) for a bookkeeping application (such as QBO). In some implementations, the computing system 100 may be configured to provide, to a user, a recommendation of a specific vendor for a specific financial transaction for selection. In some implementations, the computing system 100 may be configured to provide instructions to the bookkeeping application to automatically match the vendor to the financial transaction. In this manner, vendor to financial transaction matches may have a higher accuracy than manual matching and the process of matching may be removed from required manual tasks that may become practically impossible as the number of financial transactions grow.

While many of the below examples in describing operations of the computing system and the ensemble model are regarding the matching of vendors to financial transactions for clarity in explaining aspects of the present disclosure, the computing system and the ensemble model may be configured to perform matching for various other target objects and entities, such as the examples described above.

The system 100 may be local or may be remote to a user. For example, if the system 100 is to match vendors to financial transactions, the system 100 may execute the bookkeeping application that uses the output from the ensemble model 140 in matching vendors to financial transactions. If the bookkeeping application is a local application installed on the user's personal computing system, the ensemble model 140 may also be implemented in the personal computing system. Alternatively, the bookkeeping application and the ensemble model 140 may be implemented on a remote system that a user may access via a web portal (such as through a web browser).

The interface 110 may be one or more input/output (I/O) interfaces to obtain financial transactions (such as from one or more financial institutions), obtain user inputs (such as via a web portal for a remote system or user interface devices for a local system), provide instructions for matching entities to target objects (such as matching vendors to financial transactions), or receive or provide inputs or outputs for continued operation of the system 100. For example, the interface 110 may be used to connect with a financial institution to receive financial transactions executed for the user. An example interface may include a wired interface or wireless interface to the internet or other means to communicably couple with other devices. For example, the interface 110 may include an interface with an ethernet cable or a wireless interface to a modem, which is used to communicate with an internet service provider (ISP) directing traffic to and from other devices (such as a user's local computing system if system 100 100 is remote or to a financial institution's system). If the system 100 is local, the interface 110 may include a display, a speaker, a mouse, a keyboard, or other suitable input or output elements that allow interfacing with the user.

The database 120 may store target objects obtained by the interface 110. For example, if the target objects are financial transactions, the database 120 may store account records obtained from a financial institution. The database 120 may also store a list of entities that may be matched with a target object (such as a list of vendors for a business that may be matched with a financial transaction). The database 120 may further store instructions for matching an entity to a target object, matches recommended by the system 100, instructions regarding the ensemble model 140 (if implemented in software), or other computer executable instructions or data for operation of the system 100. In some implementations, the database 120 may include a relational database capable of presenting information (such as matches generated by the computing system 100) as data sets in tabular form and capable of manipulating the data sets using relational operators. The database 120 may use Structured Query Language (SQL) for querying and maintaining the database 120.

The processor 130 may include one or more suitable processors capable of executing scripts or instructions of one or more software programs stored in system 100 (such as within the memory 135). For example, the processor 130 may be capable of executing one or more applications or the ensemble model 140. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processors 130 may include a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. For example, the memory 135 may store the one or more applications or the ensemble model 140 that may be executed by the processor 130. The memory 135 may also store target objects (such as financial transactions), a list of entities (such as a list of vendors), matches generated by the system 100 (such as by the ensemble model 140), other outputs by the ensemble model 140, or any other data for operation of the ensemble model 140. In some implementations, hardwired circuitry may be used in place of, or in combination with, software instructions to implement aspects of the disclosure. As such, implementations of the subject matter disclosed herein are not limited to any specific combination of hardware circuitry and/or software.

The ensemble model 140, once trained, generates a final match of an entity to a target object. In some implementations, a final match may include a probability or other likelihood indicator of a selected entity matching the target object. In some other implementations, the final match may include an indication of the selection of the entity matched or recommended to be matched to the target object.

The ensemble model 140 includes a general trained ML model 150, one or more subarea trained ML models 160, and a meta-model 190. In some implementations, the general trained ML model 150 and the one or more subarea trained ML models 160 are ML classification models (also referred to herein as classification models). In some implementations, the ensemble model 140 may also include a general trained NLP model 170 and one or more subarea trained NLP models 180. As used herein, the difference between a general trained model and a subarea trained model is based on the training set used to train the specific model. For example, a general trained model is trained using a training set over a plurality of subareas, and a subarea trained model is trained using a training set associated with a specific subarea. As such, the training set for the subarea trained model may be a subset of the training set for the general trained model. In addition, a same type of classification model or NLP model may be trained to generate the general trained or subarea trained classification or NLP models for the ensemble model 140, with the difference in such models as a result of the training suing the different training sets. Training of the models is described in more detail below with reference to FIGS. 9-12.

The general trained ML model 150 and the one or more subarea trained ML models 160 may be any suitable ML model trained to generate an indication of matches between entities and target objects. The general trained ML model 150 may receive a target object and generate a general based match between the target object and one or more entities based on the target object, and a subarea trained ML model 160 may receive a target object and generate a subarea based match between the target object and one or more entities based on the target object. For example, each of the general trained ML model 150 and the one or more subarea trained ML models 160 may be a classification model to generate a match. The match may be a probability for each potential pair of entity and target object processed by the model. In another example, the match may be a selected pair or selected list of pairs (such as a prioritized list of pairs). The matches generated by the ML models 150 and 160 (such as classification models) are provided to the meta-model 190.

If the ML models 150 and 160 are classification models, any suitable classification model may be used and may be based, e.g., on one or more of decision trees, gradient boosted trees, random forests, or other classification trees. In some implementations, the classification model is a gradient boosted tree model. For example, the XGBoost software library may be used to generate the ML classification model configured to generate probabilities indicating a likelihood of an entity matching a target object. A probability may be any suitable metric, such as a percentage, a decimal from zero to one, a fraction, or a number on any suitable range to indicate the likelihood. To note, while the ML models 150 and 160 are described herein as being a classification model, the ML models may be any suitable ML models, which may be based on, e.g., any of the classification models listed above, logistic regression, nearest neighbors, control flow graphs, support vector machines, naïve Bayes, Bayesian Networks, value sets, hidden Markov models, or neural networks configured to generate probabilities.

The number of subarea trained ML models 160 existing in the ensemble model 140 may be based on the number of different subareas used to train an ML model to generate a specific subarea trained ML model. For example, if entities are associated with ten different subareas, ten instances of an ML model may be trained using different subarea specific training sets to generate ten different subarea trained ML models of the ensemble model 140. For entities being vendors and target objects being financial transactions, subareas may be the industry associated with each vendor. For example, an attorney or an accountant as a vendor may be associated with the industry of professional services, a utility company or a telecommunications provider as a vendor may be associated with the industry of utilities, a carpenter or a plumber as a provider may be associated with the industry of facility improvement or maintenance, and so on. A definition of the subareas and associations of the subareas to specific entities are stored at the computing system 100. Operations of the trained ML models 150 and 160 are described in more detail below.

If the ensemble model 140 includes a general trained NLP model 170 and one or more subarea trained NLP models 180, the trained NLP models may be any suitable NLP models trained to generate matches between entities and target objects. The general trained NLP model 170 may receive a target object and generate a general NLP based match between the target object and one or more entities based on the target object, and a subarea trained NLP model 180 may receive a target object and generate a subarea NLP based match between the target object and one or more entities based on the target object. Receiving the target object includes receiving text associated with the target object to be processed by the NLP model. For example, each of the general trained NLP model 170 and the one or more subarea trained NLP models 180 may be a NLP model to receive and process text of a target object (such as description and memo text of a financial transaction) to generate a similarity between an entity and the target object. The similarity may be any suitable indication of a likelihood that an entity is to be paired to a target object. For example, the similarity may be a probability for each potential pair of entity and target object processed by the model. In another example, the match generated by the NLP models 170 and 180 may be a selected pair or selected list of pairs (such as a prioritized list of pairs) generated by the models. The matches generated by the NLP models 170 and 180 are provided to the meta-model 190.

Any suitable NLP model may be used. For example, the general trained NLP model 170 and each subarea trained NLP model 180 may one of a Bidirectional Encoder Representations from Transformers (BERT) model, an XLNet model, a Robustly optimized BERT approach (RoBERTa) model, A Lite BERT (ALBERT) model, a Distilled version of BERT (DistilBERT) model, or a suitable unidirectional transformer. As noted above, differences between the general trained NLP model 170 and each subarea trained NLP model 180 may be based on different training sets used to train the same type of NLP model. Similar to the number of subarea trained ML models 160, the number of subarea trained NLP models 180 is based on the number of subareas used to train a NLP model to generate a specific subarea trained NLP model. Operations of the trained NLP models 170 and 180 are described in more detail below.

The meta-model 190 is any suitable model configured to combine the general based match from the general trained ML model 150 and a subarea based match from a subarea trained ML model 160 in generating a final match. If the ensemble model 140 also includes the general trained NLP model 170 and the one or more subarea trained NLP models 180, the meta-model 190 is configured to combine the general based match from the general trained ML model 150, a subarea based match from a subarea trained ML model 160, the general based NLP match from the general trained NLP model 170, and a subarea based NLP match from a subarea trained NLP model 180 in generating a final match. In some implementations, if the received matches are probabilities, similarities, or other numerical values, the meta-model 190 may implement a weighted average of the matches in generating a final match. Operations of the meta-model 190 are described in more detail below.

While the ensemble model 140 (which may include the ML models 150 and 160, the meta-model 190, and the optional NLP models 170 and 180) is depicted as a separate component of the system 100 in FIG. 1, the ensemble model 140 may be included in software including instructions stored in memory 135 or the database 120, may include application specific hardware (e.g., one or more ASICs), or a combination of the above. As such, the particular architecture of the system 100 shown in FIG. 1 is but one example of a variety of different architectures within which aspects of the present disclosure may be implemented. In addition, in other implementations, components of the system 100 may be distributed across multiple devices, may be included in fewer components, and so on. While the examples herein are described with reference to system 100, any suitable system may be used to perform the operations described herein.

If the ensemble model 140 is implemented in software, the ensemble model 140 may be implemented using any suitable computer-readable language. For example, each of the ML models (such as the classification models), the NLP models, and the meta-model of the ensemble model 140 may be programmed in the Python programming language using any suitable libraries. For example, a classification model may be programmed using the XGBoost Python library, and a NLP model may be programmed using the Fast-Bert Python library.

In the implementations described herein, an ensemble model is used to generate a final match, which may be a recommendation to a user or may be the final match to be used (such as for generating money-out transactions in a ledger based on matching vendors to financial transactions). In some implementations, the ensemble model includes four different types of ML models. For example, the ensemble model 140 includes ML models 150-180 to generate outputs that are combined by the meta-model 190 for generating a final match. An ensemble model configured to include four different types of ML models is referred to herein as a quad-ensemble ML model or quad-ensemble model. Example implementations of a quad-ensemble model are depicted in FIGS. 2 and 3, which are described below.

Figure 2:
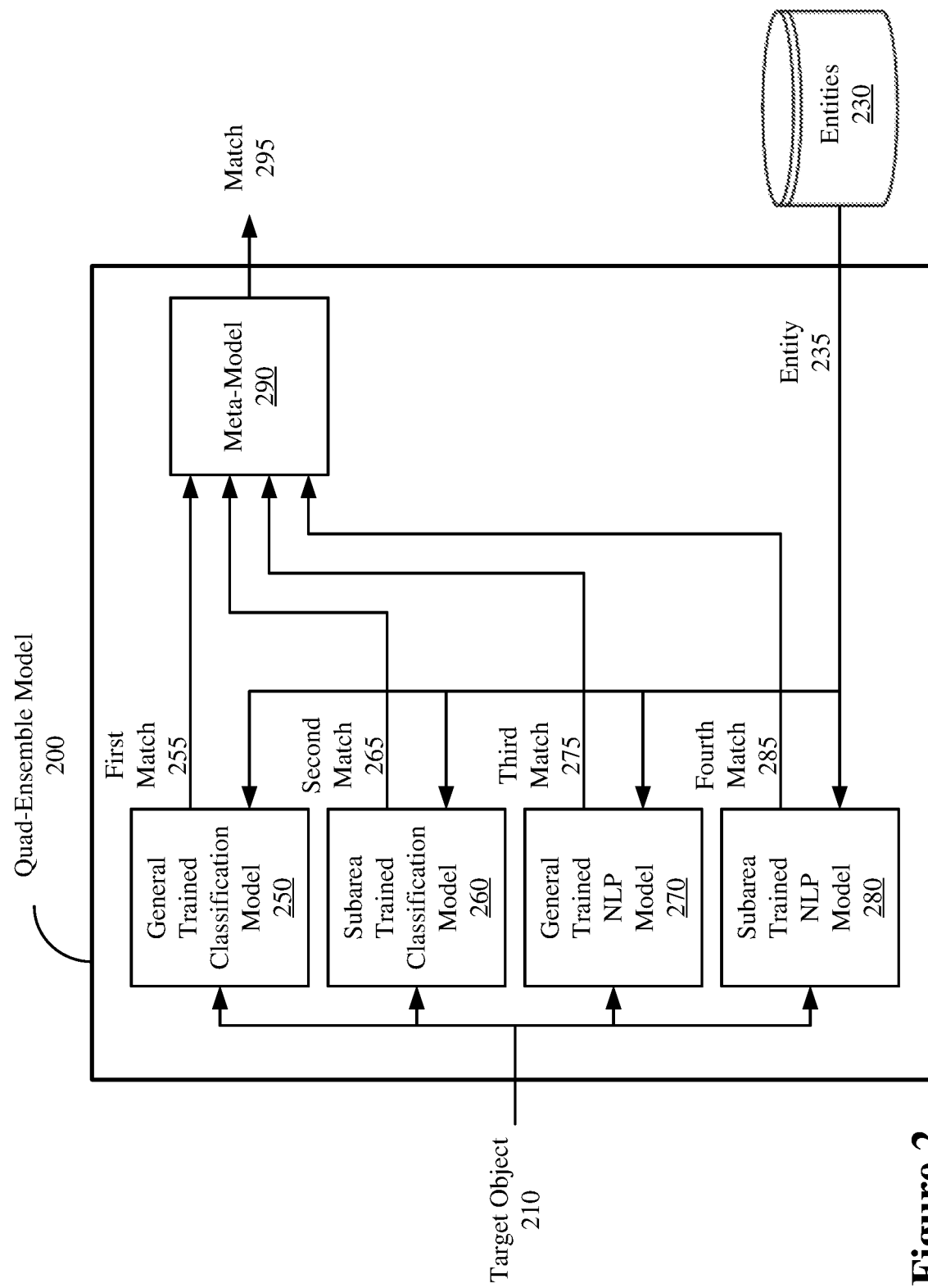
FIG. 2 shows an example ensemble machine learning (ML) model for generating matches between target objects and entities, according to some implementations.
Figure 3:
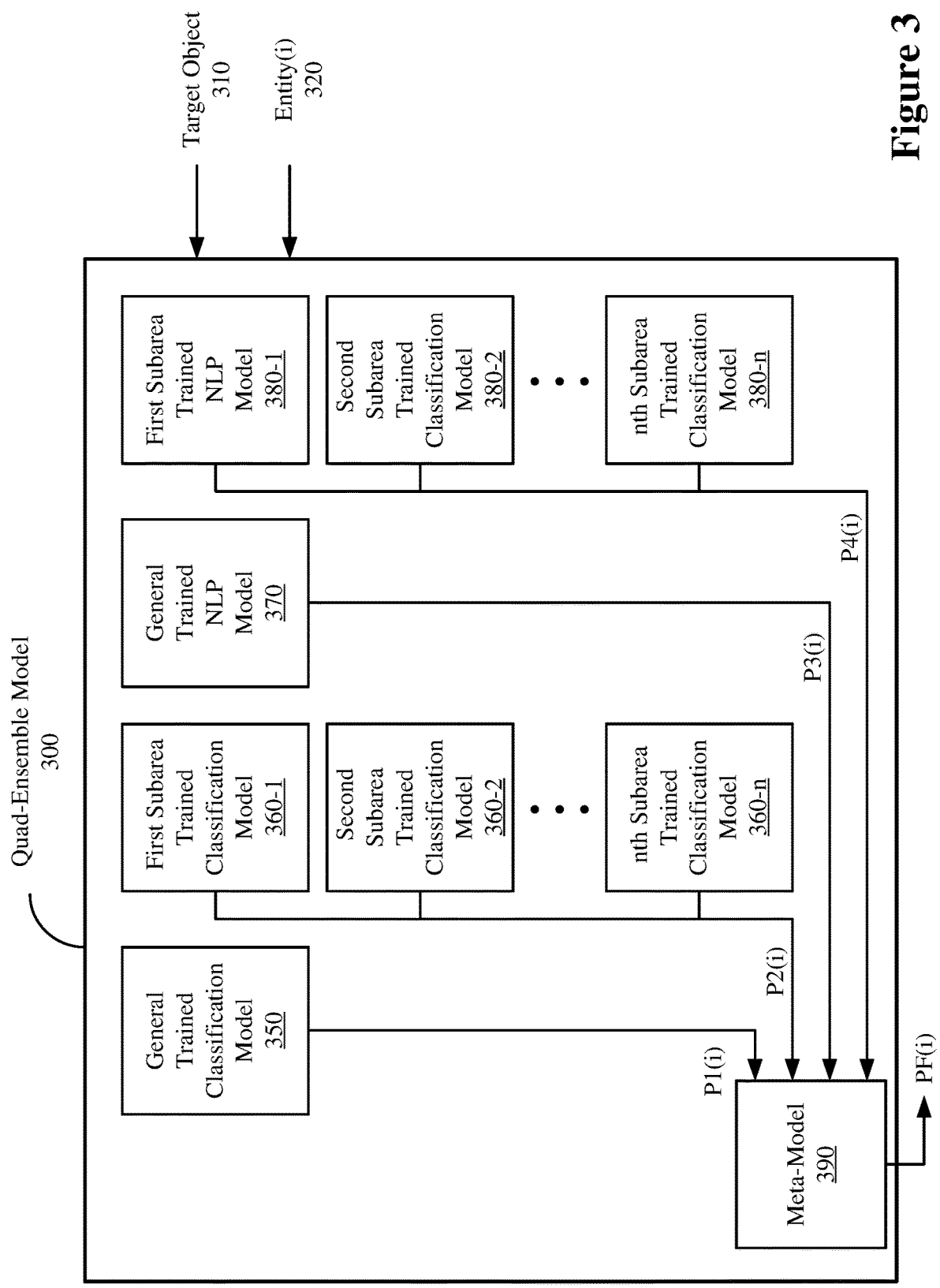
FIG. 3 shows an example quad-ensemble ML model including a plurality of subarea trained ML models, according to some implementations.

FIG. 2 shows an example ensemble model for generating matches between target objects and entities. As noted above, the ensemble model is a quad-ensemble model 200. The quad-ensemble model 200 is an example implementation of the ensemble model 140 in FIG. 1. The quad-ensemble model 200 includes a general trained classification model 250, a subarea trained classification model 260, a general trained NLP model 270, a subarea trained NLP model 280, and a meta-model 290. The general trained classification model 250 is an example implementation of the general trained ML model 150 depicted in FIG. 1, with the model being a classification model trained using training data across a plurality of subareas. The subarea trained classification model 260 is an example implementation of the subarea trained ML model 160 depicted in FIG. 1, with the model being a classification model trained using training data specific to a subarea. The general trained NLP model 270 is an example implementation of the general trained NLP model 170 depicted in FIG. 1, and the subarea trained NLP model 280 is an example implementation of the subarea trained NLP model 180 depicted in FIG. 1. The subarea associated with the subarea trained classification model 260 is the same subarea associated with the subarea trained NLP model 280. The meta-model 290 is an example implementation of the meta-model 190 depicted in FIG. 1.

The quad-ensemble model 200 is configured to receive a target object 210 and at least one of the entities 230. As depicted in FIG. 2, the target object 210 is provided to each of the models 250-280, and an entity 235 from the entities 230 is provided to each of the models 250-280. The entities 230 may be a list of entities that may be matched to the target object 210, and the list may be stored in a memory of the computing system 100 (such as the database 120 or the memory 135). Each entity 230 is associated with a subarea. For example, a first vendor is associated with a specific industry (or other type of subarea), a second vendor is associated with a specific industry (or other type of subarea), and so on.

To note, the quad-ensemble model 200 is depicted as including the ML models to be used for a specific subarea. The subarea of the models 260 and 280 is the same as the subarea associated with the entity 235. As such, only one subarea trained classification model 260 and only one subarea trained NLP model 280 are depicted in the quad-ensemble model 200. However, the quad-ensemble model 200 may include a plurality of models 260 and a plurality of model 280 for a plurality of subareas. As described below with reference to FIG. 3, the subarea trained model to be used is selected from a plurality of subarea trained models based on the subarea associated with the entity provided to the ensemble model at that moment. As such, referring back to FIG. 2, the quad-ensemble model 200 may be a specific instance of an ensemble model's components that are in use in attempting to match the target object 210 to the entity 235 of a specific subarea.

The general trained classification model 250 is configured to receive the target object 210 and the entity 235 and generate a first match 255 between the target object 210 and the entity 235. To receive the target object 210, the general trained classification model 250 is configured to receive one or more numerical features of the target object 210 as inputs. To note, any suitable numerical features of a target object may be inputs. For example, for a financial transaction, example numerical features may include a time of the transaction, an amount of the transaction, a zip code of the transaction, and so on. While not depicted in FIG. 2, the target object 210 may be processed to obtain the one or more numerical features of the target object 210, and providing the target object 210 includes providing the obtained features from the target object 210 to the classification model 250. Providing the entity 235 to the classification model 250 may include providing a representation of the entity 235 for the classification model 250 to be able to recognize the entity 235 as the one to be paired with the target object 210 for generating the first match 255.

In some implementations, the first match 255 generated by the classification model 250 is a probability that the entity 235 is a final match for the target object 210. For example, the first match 255 may be a value from 0 to 1 indicating a likelihood that the entity 235 and the target object 210 are to be matched. In some other implementations, the first match 255 generated by the classification model 250 may be an indication as to whether the entity 235 is to be matched with the target object 210. For example, the classification model 250 may generate a probability and compare the probability to a threshold. An example thresholds may be a set probability above which the entity 235 may be considered a likely candidate for matching to the target object 210. Another example threshold may include the highest probability generated by the model 250 for each of the entities 230 being associated with the entity 235 (with the first match 255 indicating that entity 235 is the most likely entity from the entities 230 to be matched to the target object 210). A further example threshold may include the model 250 being configured to output a list of the five or another number of entities from the entities 230 associated with the highest probabilities generated by the model 250. To note, examples below refer to the matches being probabilities for clarity, but any suitable type of match may be output by a model (such as the classification model 250).

The subarea trained classification model 260 is configured to receive the target object 210 and the entity 235 and generate a second match 265. The subarea trained classification model 260 may be similar to the general trained classification model 250 except that the subarea trained classification model 260 is trained using training data specific to a subarea. As such, receiving the target object 210 by the model 260 may be similar to receiving the target object 210 by the model 250, with the model 260 receiving one or more numerical features obtained from the target object 210.

Receiving the entity 235 by the model 260 may include the model 260 receiving the same representation of the entity 235 received by the model 250. In addition, the second match 265 may be similar to first match 255, such as being a probability of the likelihood of matching the entity 235 to the target object 210, an indication of whether the entity 235 is a likely candidate to be matched to the target object 210, etc. In the examples below, the match from the subarea trained classification model is described as including a probability.

The general trained NLP model 270 is configured to receive the target object 210 and the entity 235 and generate a third match 275. To receive the target object 210, the general trained NLP model 270 is configured to receive text of the target object 210 as an input. To note, any text of a target object may be an input. For example, a financial transaction may include text in a description portion and a memo portion of the financial transaction (such as depicted in FIG. 7, which is described in more detail below). While not depicted in FIG. 2, the target object 210 may be processed to obtain the text of the target object 210, and providing the target object 210 includes providing the text from the target object 210 to the NLP model 270. To note, any suitable portion of text may be configured to be provided to the NLP model. As such, not all text of the target object 210 is required to be provided. Providing the entity 235 to the NLP model 270 may include providing text of the entity 235 (such as the name of the vendor) for the NLP model 270 to be able to generate the third match 275.

In some implementations, the third match 275 generated by the NLP model 270 is a similarity between the entity 235 and the text of the target object 210. For example, a NLP model may receive the target object text and generate a first embedding vector from the target object text. The NLP model may also receive an entity name and generate a second embedding vector from the vendor name. The similarity generated may be a similarity between the two embedding vectors (such as a cosine similarity calculated between the two embedding vectors). The cosine similarity may be treated as a probability indicating the likelihood to match the entity to the target object.

In some implementations, the similarity may be a probability similar to a probability generated by the classification models 250 and 260. For example, the third match 275 may be a value from 0 to 1 indicating a likelihood that the entity 235 and the target object 210 are to be matched. To note, the similarity generated by an NLP model may be on a different scale than a probability generated by a classification model. As such, the probabilities and the similarities may be normalized before being compared or combined.

In some other implementations and similar to as described above with reference to the first match 255, the third match 275 generated by the NLP model 270 may be an indication as to whether the entity 235 is to be matched with the target object 210. For example, the NLP model 270 may generate a similarity and compare the similarity to a threshold, with example thresholds being similar to as described above with reference to the first match 255. As such, the third match 275 may indicate one or more entities that are likely candidates for matching to the target object 210. In the examples below, the match from the general trained NLP model is described as including a similarity.

The subarea trained NLP model 280 is configured to receive the target object 210 and the entity 235 and generate a fourth match 285. The subarea trained NLP model 280 may be similar to the general trained NLP model 270 except that the subarea trained NLP model 280 is trained using training data specific to a subarea. As such, receiving the target object 210 by the model 280 may be similar to receiving the target object 210 by the model 270, with the model 280 receiving text of the target object 210. Receiving the entity 235 by the model 280 may include the model 280 receiving the same text of the entity 235 received by the model 270. In addition, the fourth match 285 may be similar to third match 275, such as being a similarity, which may be a probability of the likelihood of matching the entity 235 to the target object 210, an indication of whether the entity 235 is a likely candidate to be matched to the target object 210, etc. In the examples below, the match from the subarea trained NLP model is described as including a similarity.

The first match 255, the second match 265, the third match 275, and the fourth match 285 are provided to the meta-model 290, and the meta-model 290 generates match 295 based on combining the first match 255, the second match 265, the third match 275, and the fourth match 285. If the first match 255 is a first probability and the second match 265 is a second probability, the meta-model 290 may combine the first probability and the second probability using a weighted average. Similarity, if the third match 275 is a first similarity and the fourth match 285 is a second similarity, the meta-model 290 may combine the first similarity and the second similarity using a weighted average. If probabilities and similarities are measured using different scales, the probabilities and similarities may be normalized so that they are measured on the same scale. In this manner, the meta-model 290 may use a weighted average to combine the probabilities and similarities in generating the match 295.

Assuming that probabilities and similarities are measured on the same scale, an example weighted average is depicted in equation (1) below:

$$PF = a*P1 + b*P2 + c*S1 + d*S2 \tag{1}$$

PF is the final probability indicating the final likelihood generated by the meta-model 290 that the entity 235 is to be matched to the target object 210. P1 is the first probability, a is the weight applied to the first probability, P2 is the second probability, b is the weight applied to the second probability, S1 is the first similarity, c is the weight applied to the first similarity, S2 is the second similarity, and d is the weight applied to the second similarity. To note, weights a, b, c, and d may be any suitable weights. For example, the meta-model 290 may be trained by adjusting the weights to generate optimum final probabilities by the meta-model 290.

In some implementations, a meta-model may generate a final probability for each entity of the entities 230 that may be matched to the target object 210. In this manner, a final match of an entity from the entities 230 to the target object 210 may be based on the greatest final probability generated across the entities 230. For example, match 295 may be the final probability for the pair of entity 235 and target object 210. If match 295 is greater than all other matches generated for each of the other entities 230, the final match generated may be the match 295 or an indication of the entity 235 associated with the match 295.

An ensemble model may include a plurality of subarea trained ML models, with the number of models based on the number of subareas. For example, if a number of subareas is eight (such as vendors in eight different industries), a quad-ensemble model may include eight subarea trained classification models and eight subarea trained NLP models.

FIG. 3 shows an example quad-ensemble model 300 including a plurality of subarea trained ML models, according to some implementations. The quad-ensemble model 300 is an example implementation of the quad-ensemble model 200 (with the model 200 including a plurality of subarea trained classification models 260 and a plurality of subarea trained NLP models 280). The quad-ensemble model 300 includes a general trained classification model 350, subarea trained classification models 360-1 to 360-$n$ for n number of subareas, a general trained NLP model 370, and subarea trained NLP models 380-1 to 380-$n$ for the n number of subareas.

The quad-ensemble model 300 is configured to receive target object 310 (which may be the same as target object 210) and a plurality of entities 320 (depicted as entity(i) for integer i from 1 to k, with k being the number of entities to attempt to be matched to the target object 310). The quad-ensemble 300 thus generates a final probability for each entity 320 indicating a likelihood that the entity is to be matched to the target object 310. The final probability is depicted in FIG. 3 as PF(i) associated with entity(i) for i from 1 to k.

For each i from 1 to k, the general trained classification model 350 receives the target object 310 and the entity(i) 320 and generates a probability P1(i) that indicates a likelihood that the entity(i) is to be matched to the target object. In addition, for each i from 1 to k, the general trained NLP model 370 receives the target object 310 and the entity(i) 320 and generates a similarity between the entity(i) and the target object (which is depicted as probability P3(i) that indicates a likelihood that the entity(i) is to be matched to the target object).

Regarding the subarea trained classification models and NLP models, in the example, entity(i) is associated with a subarea j from subareas 1 to n. For example, an entity 1 may be associated with a subarea 1, an entity 2 may be associated with a subarea 2, an entity 3 may be associated with a subarea 1, and so on. Any number of entities may be associated with the same subarea. As such, the number of subareas typically will not equal the number of entities. For example, 500 vendors may be grouped and associated with 30 different industries.

For each entity(i) from 1 to k, entity(i) is provided to the subarea trained classification model 360-$j$ (along with the target object 310) for the subarea trained classification model 360-$j$ to generate a probability P2(i) that entity(i) is to be matched to the target object. In addition, for each entity(i) from 1 to k, entity(i) is provided to the subarea trained NLP model 380-$j$ (along with the target object 310) for the subarea trained NLP model 380-$j$ to generate a similarity between entity(i) and the target object (which is depicted as probability P4(i) that entity(i) is to be matched to the target object).

In some implementations, while not depicted in FIG. 1, the computing system 100 may include selection logic to select the subarea trained ML models to be used for a specific entity and thus ensure that an entity associated with a specific subarea is provided to the specific subarea trained ML models. For example, the quad-ensemble model 300 may include switching logic to route entity(i) to the jth subarea trained classification model 360-$j$ and the jth subarea trained NLP model 380-$j$, with the jth subarea trained classification model 360-$j$ generating P2(i) and the jth subarea trained NLP model 380-$j$ generating P4(i).

The meta-model 390 is configured to generate PF(i) based on combining P1(i), P2(i), P3(i), and P4(i). The meta-model 390 may generating PF(i) using a weighted average depicted in equation (2) below, which is based on equation (1) above:

$$PF(i) = a*P1(i) + b*P2(i) + c*P3(i) + d*P4(i) \tag{2}$$

In this manner, the meta-model 390 generates k PFs associated with the k entities. In some implementations, a final match of an entity to the target object 310 is based on a maximum PF from the k PFs. For example, the meta-model 390 may be configured to generate the final match as a final probability (or the entity associated with the final probability) calculated using equation (3) below:

$$PF = \max_{i \to 1 \ to \ k}(PF(i)) \tag{3}$$

As depicted in equation (3), PF is the maximum probability across all entities(i) from 1 to k. As such, the meta-model 390 may indicate the entity associated with PF and may also indicate the PF calculated. In some implementations, the computing system 100 may indicate the entity (and, optionally, the PF) to a user as a recommendation of a match to the target object 310. In some other implementations, the computing system 100 may automatically match the entity and the target object based on the calculated PF.

In some instances, the calculated PF may still be relatively low. For example, each PF(i) calculated for a target object may be less than 0.5 on a scale from 0 to 1. As such, the PF is less than 0.5, which may indicate that the selected entity is less likely to be a match to the target object than not be a match to the target object. In some implementations, the meta-model may compare the PF to a defined threshold to ensure that the selected entity is to be matched to the target object. In this manner, if the PF is less than the defined threshold, the meta-model does not generate a final match for the target object. Any suitable threshold may be defined, such as 0.5, 0.8, 0.9, etc. on a scale from 0 to 1. If the computing system 100 is to provide a recommendation to a user, the computing system 100 may indicate to a user that a match was not found. If the computing system 100 is to automatically match entities to target objects, the computing system 100 may leave the target object as unmatched. In some implementations, the computing system 100 may indicate to a user that the target object is unmatched. In this manner, a user may be able to manually match an entity to the target object.

Referring back to the outputs of the models 350-380, if the outputs are an indication of one or more entities instead of probabilities P1-P4, the indicated entities may be the entity (or a top list of entities) associated with the highest probability or probabilities generated by the respective ML model. As such, each model 350-380 may perform operations similar to as depicted in equation (3) above, except for its own generated probabilities. If the models 350-380 indicate specific entities instead of probabilities, combining the outputs from the models 350-380 by the meta-model 390 may include the meta-model 390 using a vote checker to identify the entity indicated the most number of times across the models 350-380 for target object 310 as the entity top be matched to the target object 310. In this manner, each model 350-380 may also apply a threshold to the probabilities to ensure that the selected entity or entities output to the meta-model 390 may be matched to the target object 310.

Figure 4:
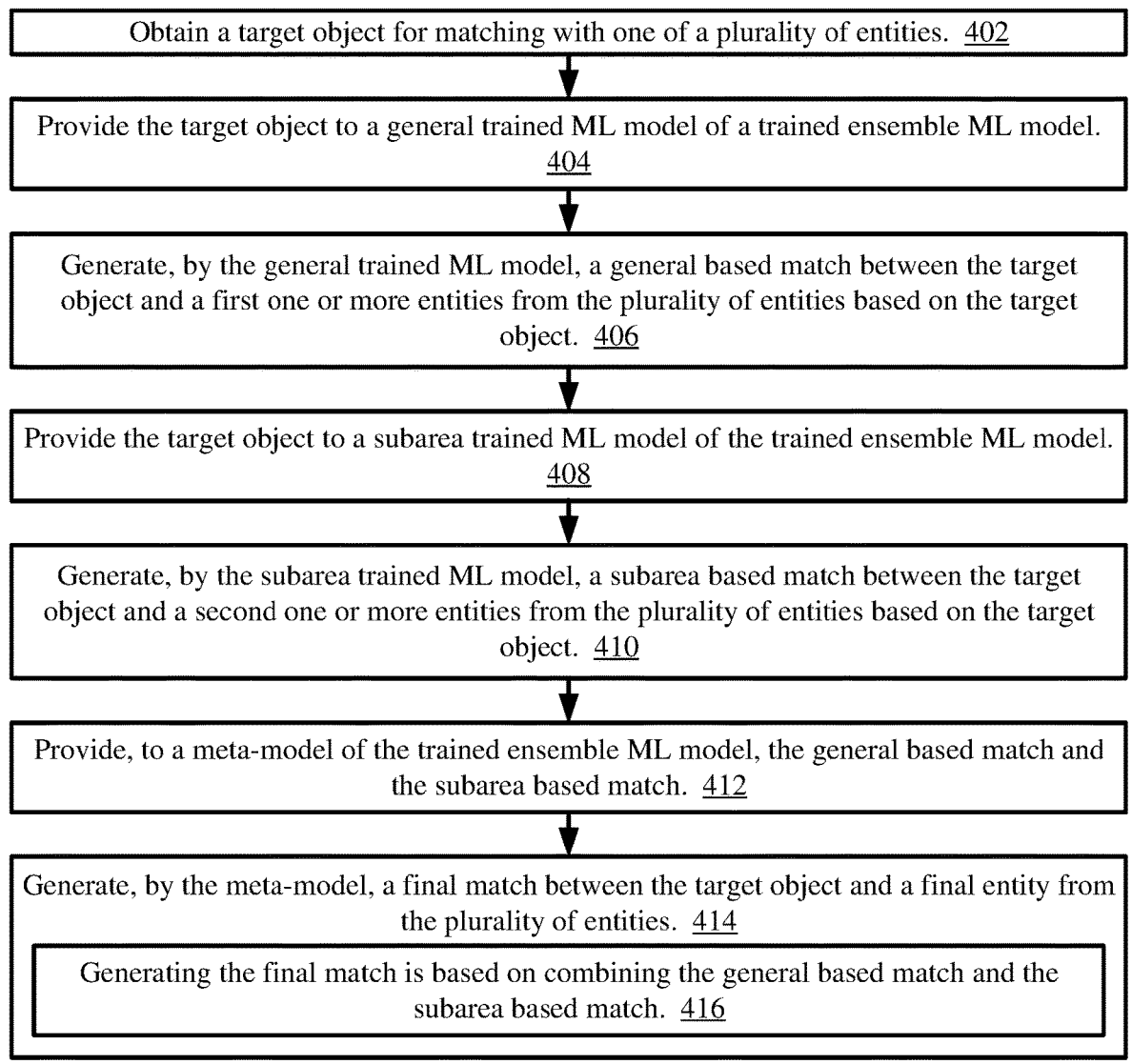
FIG. 4 shows an illustrative flow chart depicting an example operation of a computing system for matching an entity to a target object, according to some implementations.
Figure 5:
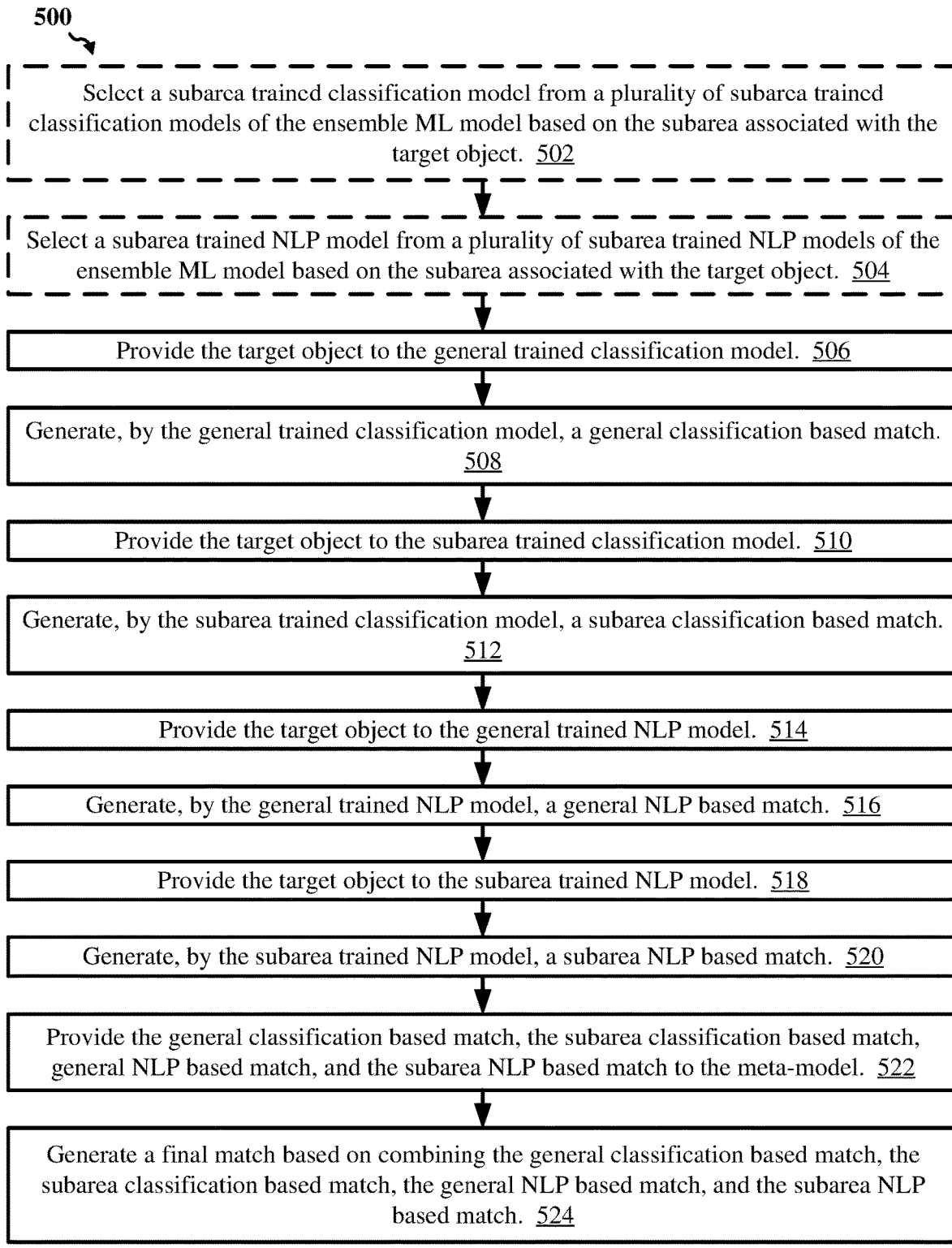
FIG. 5 shows an illustrative flow chart depicting an example operation of a trained ensemble ML model for matching an entity to a target object, according to some implementations.

FIGS. 4-6, which are described below, show illustrative flow charts of example operations to be performed by a computing system and an ensemble model for matching an entity to a target object.

FIG. 4 shows an illustrative flow chart depicting an example operation 400 of a computing system for matching an entity to a target object, according to some implementations. The example operation 400 is described as being performed by the computing system 100 for clarity. The computing system's ensemble model 140 includes at least the general trained ML model 150, a subarea trained ML model 160, and the meta-model 190.

At 402, the system 100 obtains (such as by the interface 110) a target object for matching with one of a plurality of entities. In the example of matching vendors to financial transactions, the target object is a financial transaction. The financial transaction may be obtained from a financial statement for a business (such as a monthly summary of financial transactions from a financial institution for the business, such as a bank or credit card company) or may be obtained in near real-time (such as via push notifications by the financial institution). The plurality of entities that may be matched to the financial transaction for a business is the vendors associated with the business. The vendors may be predefined by a user or may be defined during processing of previous POs and financial transactions for the business. As such, the system 100 may store a list of vendors for the business, and the list may also indicate the corresponding industry (or another suitable area) associated with each vendor.

FIG. 8 shows an example list 800 of vendors and associated industries stored in memory, according to some implementations. The vendor column includes the name or other indication of the vendor, and the industry column includes the name or other indication of the industry. As depicted, vendors 1, 5, 6, and 8 of those depicted are associated with industry A, vendors 2, 4, and 9 of those depicted are associated with industry B, and vendors 3 and 7 of those depicted are associated with industry C. To note, the list 800 may include any number of vendors and any number of industries. In some implementations, the list may be stored in a table that may be sorted or otherwise organized in any suitable manner. For example, the system 100 may be configured to sort the list 800 by vendor name, by vendors associated with the same subareas, by subarea, in chronological order or being added to the list (with new vendors working with the business over time being added to the list 800 over time), and so on. In providing an entity to each ML model of the ensemble model 140, the system 100 may access the memory storing the list 800 and use the list 800 to provide the entity (vendor) to an ML model. In some implementation, the system 100 provides all vendors in the list 800 to the ensemble model 140 to attempt to match each of the vendors to a financial transaction (such as to find the vendor associated with the highest final probability). In some other implementations, the system 100 may provide a subset of vendors in the list 800 to the ensemble model 140. For example, the system 100 may provide vendors one by one in a defined order to the ensemble model 140 to iteratively generate a final probability until a final probability above a defined threshold is generated. In this manner, the system 100 may consider the vendor associated with final probability that satisfies the threshold to be "good enough" and thus be matched or recommended for match.

Referring back to FIG. 4, to note, if a monthly financial report including a plurality of financial transactions is received, the system 100 may attempt to match each financial transaction with a vendor. To generalize to other use cases, the system 100 may perform operation 400 multiple times to attempt to match each target object obtained to one of the plurality of entities.

At 404, the system 100 provides the target object to the general trained ML model 150 of the trained ensemble ML model 140. For example, if the general trained ML model 150 is a classification model with inputs of defined numerical features, the system 100 processes the target object to obtain the numerical features of the target object, with providing the target object to the general trained ML model 150 including providing the obtained numerical features as inputs to the classification model. In the use case of matching financial transactions with vendors, the system 100 may process a financial transaction to obtain the transaction amount, transaction date, transaction location, or other features to be input to a classification model. To note, a classification model may be defined to receive any suitable inputs to be used for generating a potential match (such as a probability of a vendor to be matched to the target object).

At 406, the system 100 generates, by the general trained ML model 150, a general based match between the target object and a first one or more entities from the plurality of entities based on the target object. As noted above, each entity or a subset of entities of the plurality of entities (such as from a list of entities) may be provided to the general trained ML model 150. For each entity provided to the general trained ML model 150, the general trained ML model 150 may generate an indication as to whether the entity is to be matched to the target object. In some implementations, the indication may be a calculated probability. In some other implementations, the indication may be whether the calculated probability is greater than a threshold.

At 408, the system 100 provides the target object to a subarea trained ML model 160 of the trained ensemble ML model 140. Providing the target object to the subarea trained ML model 160 may be similar to providing the target object to the general trained ML model 150. One or more entities are also provided to the subarea trained ML model 160. If the ensemble model 140 includes a plurality of subarea trained ML models 160, the system 100 may provide a target object and an entity to the subarea trained ML model 160 associated with the same subarea as the provided entity. For example, if the system 100 is attempting to match vendor 1 from list 800 in FIG. 8 to a financial transaction, the system 100 may provide the financial transaction (such as numerical features) and the vendor 1 (such as an indication of vendor 1) to an industry trained ML model (such as an industry trained classification model) associated with industry A.

At 410, the system 100 generates, by the subarea trained ML model 160, a subarea based match between the target object and a second one or more entities from the plurality of entities based on the target object. As noted above, each entity or a subset of entities of the plurality of entities (such as from a list of entities) may be provided to a subarea trained ML model 160. The entities provided to a specific subarea trained ML model 160 includes those entities associated with the same subarea. For example, referring to FIG. 8, one or more of the vendors 1-9 may be provided to one or more subarea trained ML models, such as providing vendors 1, 5, 6, and 8 be provided to a subarea trained ML model 160 associated with industry A, providing vendors 2, 4, and 9 to a subarea trained ML model 160 associated with industry B, and providing vendors 3 and 7 associated with industry C. For each entity provided to a subarea trained ML model 150, the subarea trained ML model 150 may generate an indication as to whether the entity is to be matched to the target object. In some implementations, the indication may be a calculated probability. In some other implementations, the indication may be whether the calculated probability is greater than a threshold.

At 412, the system 100 provides the general based on match and the subarea based match to the meta-model 190 of the trained ensemble ML model 140. For example, for a specific entity provided to a general trained ML model 150 and provided to a subarea trained ML model 160, a probability generated by the general trained ML model 150 and a probability generated by the subarea trained ML model 160 may be provided to the meta-model 190.

At 414, the system 100 generates, by the meta-model 190, a final match between the target object and a final entity from the plurality of entities. Generating the final match is based on combining the general based match and the subarea based match (416). For example, if the meta-model 190 may generate a final match by using a weighted average to combine a first probability and a second probability from the ML models for the potential pair of the target object and a specific entity to generate a final probability.

Operation 400 may be enhanced to include use of a general trained NLP model 170 and one or more subarea trained NLP models 180 that may be included in the ensemble model 140. The meta-model 190 may thus be configured to combine outputs from the general trained ML model 150 (which may be a general trained classification model), from the general trained NLP model 170, from a subarea trained ML model 160 (which may be a subarea trained classification model), and from a subarea trained NLP model 180. Example operation of such a quad-ensemble model is described in more detail below with reference to FIG. 5.

FIG. 5 shows an illustrative flow chart depicting an example operation 500 of a trained ensemble ML model for matching an entity to a target object, according to some implementations. The example operation 500 is described as being performed by a system 100 including the quad-ensemble model 300, which is an example implementation of the ensemble model 140 of the system 100. As depicted in FIG. 3, a general trained ML model 150 of the ensemble model 140 may be a general trained classification model 350, and the one or more subarea trained ML models 160 of the ensemble model 140 may be one or more subarea trained classification models 360 (such as a number of subarea trained classification models 360 equal to the number of subareas used in training the classification models 360). In addition, the example implementation of the ensemble model 140 also includes the general trained NLP model 170 (depicted as the general trained NLP model 370 in FIG. 3) and one or more subarea trained NLP models 180 (depicted as the subarea trained NLP models 380 in FIG. 3). If the quad-ensemble module includes multiple subarea trained classification models and multiple subarea trained NLP models, the example operation 500 may include blocks 502 and 504. Operation 500 may be performed after obtaining a target object that is to be matched with an entity (such as after obtaining a financial transaction that is to be matched with a vendor).

At 502, the system 100 selects a subarea trained classification model from a plurality of subarea trained classification models of the ensemble ML model based on the subarea associated with the received target object. Each of the plurality of subarea trained classification models is associated with a unique subarea from a plurality of subareas. For example, if the entities that may be matched to the target object are the vendors listed in list 800, each time the system 100 is to provide a vendor to the quad-ensemble model 300, the system 100 may identify the industry associated with the vendor and select the subarea trained classification model 360 associated with the identified industry. In a specific example, the system 100 accesses the list 800 in memory, obtains (such as the database 120), obtains, e.g., vendor 1 from the list 800, and identifies industry A as being associated with vendor 1. If the first subarea trained classification model 360-1 is associated with industry A, the system 100 selects the first subarea trained classification model 360-1 to receive the target object and entity and generate an output (such as the P2(i), as depicted in FIG. 3) associated with the pair of the target object and vendor 1.

At 504, the system 100 selects a subarea trained NLP model from a plurality of subarea trained NLP models of the ensemble ML model based on the subarea associated with the received target object. Similar to the subarea trained classification models, each of the plurality of subarea trained NLP models is associated with a unique subarea from a plurality of subareas. To note, the number of subarea trained NLP models may be the same as the number of subarea trained classification models, with each subarea trained NLP model corresponding to a subarea trained classification model associated with the same subarea. In the specific example of the system 100 to provide vendor 1 associated with industry A to the quad-ensemble model 300, if the first subarea trained NLP model 380-1 is associated with industry A, the system 100 selects the first subarea trained NLP model 380-1 to receive the target object and entity and generate an output (such as the P4(i), as depicted in FIG. 3) associated with the pair of the target object and vendor 1.

At 506, the system 100 provides the target object to the general trained classification model 350. Block 506 is an example implementation of block 404 depicted in FIG. 4, with the general trained ML model in block 404 being a general trained classification model. As such, providing the target object to the general trained classification model 350 may include obtaining numerical features of the target object (such as the amount, date, etc. of a financial transaction) and providing the features to the general trained classification model 350. While not depicted in FIG. 5, the system 100 may also provide an entity(i) (such as vendor 1 from the list 800) to the general trained classification model 350. To note, one or more of the numeric features may be based on text character features, which may be depicted in a manner usable by a classification model. For example, a numeric feature may include a character string distance between a vendor name and a financial transaction text to indicate the number of characters that would need to be changed for the vendor name to appear in the financial transaction text. In a specific example referring to the financial statement 700, the target object is the last financial transaction depicted in FIG. 7. Text 706 is provided to a NLP model. In addition, one of the vendors for the business associated with the statement 700 is US Foods®. The name "US FOODS" may be listed in the list 800 stored in memory. In providing a numeric feature associated with the entity US Foods to the classification models, the system 100 may provide the character string distance between the text 706 and the vendor name as zero or a negligible amount since, as can be seen, the name appears in the text without need to change any characters.

At 508, the system 100 generates, by the general trained classification model 350, a general classification based match. The general classification based match is based on the potential pair of the provided target object and provided entity. For example, the general trained classification model 350 may generate the first probability P1(i) associated with the pair of entity(i) and the target object indicating the likelihood that entity(i) is to be matched to the target object. Alternatively, the general trained classification model 350 may generate an indication as to whether entity(i) is a candidate match (such as based on P1(i) being greater than a threshold). Block 508 is an example implementation of block 406 depicted in FIG. 4, with the general based match between the target object and a first one or more entities in block 406 being a general based classification match between the target object and entity(i).

At 510, the system 100 provides the target object to the subarea trained classification model 360. Block 510 is an example implementation of block 408 depicted in FIG. 4, with the subarea trained ML model in block 408 being the selected subarea trained classification model 360. As such, providing the target object to the selected subarea trained classification model 360 may include obtaining numerical features of the target object (such as the amount, date, etc. of a financial transaction) and providing the features to the subarea trained classification model 360. While not depicted in FIG. 5 and similar to described above with reference to the general trained classification model, the system 100 may also provide the entity(i) (such as vendor 1 from the list 800) to the selected subarea trained classification model 360.

At 512, the system 100 generates, by the subarea trained classification model 360, a subarea classification based match. The subarea classification based match is based on the potential pair of the provided target object and provided entity. For example, the selected subarea trained classification model 360 may generate the second probability P2(i) associated with the pair of entity(i) and the target object indicating the likelihood that entity(i) is to be matched to the target object. Alternatively, the subarea trained classification model 360 may generate an indication as to whether entity(i) is a candidate match (such as based on P2(i) being greater than a threshold). Block 512 is an example implementation of block 410 depicted in FIG. 4, with the subarea based match between the target object and a second one or more entities in block 410 being a subarea based classification match between the target object and entity(i).

At 514, the system 100 provides the target object to the general trained NLP model 370. While not depicted in FIG. 5, the system 100 may also provide the entity(i) (such as vendor 1 from the list 800) to the general trained NLP model 370. As noted above, providing a target object and an entity to a NLP model includes providing text of the target object and the name of the entity to the NLP model. For example, if the entity is vendor 1 from the list 800, the system 100 may provide the text in list 800 that is the name of vendor 1. If the target object is a financial transaction, the system 100 may provide text from one or more of a description field or a memo field from the financial transaction. As noted above, a financial transaction may be obtained in a financial statement (such as a monthly summary statement). The statement may include a description field and a memo field with text that may be provided to a NLP model. A portion of an example financial statement for a plurality of financial transactions including text that may be provided to a NLP model is depicted in FIG. 7, which is described in more detail below.

FIG. 7 shows example texts for processing by a NLP model. The texts are part of a financial statement 700, with a portion of the financial statement 700 shown in FIG. 7. The portion of the financial statement 700 shown is for seven financial transactions. As shown, the financial statement 700 includes a description field 702 and a memo field 704 for each of the financial transactions. While not shown, the financial statement 700 may include other fields or portions, such as dates and amounts associated with each financial transaction, account information, and so on. Areas of text in FIG. 7 marked 'XXXX' are areas that may include personal account details or other identifiable information. In the example financial transaction texts, the text in the memo field 704 typically mirrors the text in the description field 702. However, the text may differ between fields. For example, the memo field may be manually generated notes from a user or a financial institution employee regarding specific transactions. In another example, the memo field 704 may include a combination of a user note and text from the description field 702 (such as depicted in text 706). In text 706, the text in the memo field 704 for the transaction includes the text from the description field 702 plus the user note "weekly food delivery for office." Providing a financial transaction to a NLP model may include providing, for a financial transaction, the text from the description field 702, the text from the memo field 704, or a combination of both.

Referring back to FIG. 5, the system 100 generates, by the general trained NLP model 370, a general NLP based match (516). The general NLP based match is based on the potential pair of the provided target object and provided entity. For example, the general trained NLP model 370 may generate the third probability P3(i) associated with the pair of entity(i) and the target object indicating the likelihood that entity(i) is to be matched to the target object (such as a cosine similarity between embedding vectors for the target object and the entity(i)). Alternatively, the general trained NLP model 370 may generate an indication as to whether entity(i) is a candidate match (such as based on P3(i) being greater than a threshold).

Referring back to FIG. 5, the system 100 also provides the target object to the subarea trained NLP model 380 (518). While not depicted in FIG. 5, the system 100 may also provide the entity(i) (such as vendor 1 from the list 800) to the subarea trained NLP model 380. As noted above, providing a target object and an entity to a NLP model includes providing text of the target object and the name of the entity to the NLP model. For example, the text and entity name provided to the general trained NLP model 370 may also be provided to the selected subarea trained NLP model 380. As noted above, each subarea trained NLP model 380 may be similar to the general trained NLP model 370 except that each subarea trained NLP model 380 is trained using a different training data set than each other (which is based on subarea) and the general trained NLP model 370 (which may be across all subareas).

At 520, the system 100 generates, by the subarea trained NLP model 380, a subarea NLP based match. The subarea NLP based match is based on the potential pair of the provided target object and provided entity. For example, the selected subarea trained NLP model 380 may generate the fourth probability P4(i) (or another suitable similarity) associated with the pair of entity(i) and the target object indicating the likelihood that entity(i) is to be matched to the target object. Alternatively, the selected subarea trained NLP model 380 may generate an indication as to whether entity(i) is a candidate match (such as based on P4(i) being greater than a threshold).

At 522, the system 100 provides the general classification based match, the subarea classification based match, the general NLP based match, and the subarea NLP based match to the meta-model 390. In some implementations, the system 100 may provide P1(i), P2(i), P3(i), and P4(i) for the potential pairing of entity(i) to the target object. In some other implementations, the system 100 may provide an indication as to whether entity(i) is a candidate match (such as based on the corresponding P1(i), P2(i), P3(i), or P4(i) being greater than a threshold) from each of the models 350-380.

At 524, the system generates a final match based on combining the general classification based match, the subarea classification based match, the general NLP based match, and the subarea NLP based match. If P1(i), P2(i), P3(i), and P4(i) are provided in block 522, the meta-model 590 may use a weighted average to generate a PF(i) (such as using equation (2) above). If indications whether entity(i) is a candidate match are provided in block 522, the meta-model 590 may use a vote checker or other means to count the number indications for entity(i).

Assuming that the meta-model 390 generates a PF(i) associated with the potential pairing of entity(i) and the target object, the meta-model 390 may generate a PF(i) for each entity(i) provided to the quad-ensemble model 300. For example, the system 100 may provide each vendor from list 800 to the quad-ensemble model 300, and the meta-model 390 may generate a PF for each potential pairing of vendor and the target object. As such, a final match of the entity that is to be ultimately paired to the target object may be based on the plurality of PFs generated by the meta-model 390 for the different pairings of the target object and the plurality of entities.

FIG. 6 shows an illustrative flow chart depicting an example operation 600 of a trained ensemble ML model for matching an entity to a target object based on probabilities and similarities generated for different potential entity and target object pairs, according to some implementations. The example operation 500 is described as being performed by a system 100 including the quad-ensemble model 300, which is an example implementation of the ensemble model 140 of the system 100. The general trained classification model 350 is configured to generate a probability P1(i) for the target object-entity(i) pair. A subarea trained classification model 360 is configured to generate a probability P2(i) for the target object-entity(i) pair. The general trained NLP model 370 is configured to generate a first similarity between the target object and entity(i) (which is a probability P3(i) in the examples herein). A subarea trained NLP model 380 is configured to generate a second similarity between the target object entity(i) (which is a probability P4(i) in the examples herein).

Operation 600 includes operations performed in response to the quad-ensemble model 300 receiving a target object and a plurality of entities. As noted above, a plurality of entities may be provided to the quad-ensemble model 300. Any suitable plurality of entities may be provided to the quad-ensemble model 300. In some implementations, each and every entity may be provided to the quad-ensemble model 300. For example, each and every vendor in list 800 may be provided sequentially to the quad-ensemble model 300 so that the meta-model 390 may generate a final probability for each target object-entity pair. In some other implementations, only a subset of entities may be provided to the quad-ensemble model 300. For example, vendors in list 800 may be provided sequentially until a final probability generated by the meta-model 390 is greater than a threshold (indicating a "close enough" match). In this manner, speed in generating a match may be increased at the cost of decreasing accuracy. As such, the plurality of entities provided to the quad-ensemble model 300 for the example operation 600 may be any suitable set of entities.

At 602, for each entity, the system 100 generates, by the general trained classification model 350, a first probability of the entity matching the target object. For example, assuming the vendors in vendor list 800 is to be provided to the quad-ensemble model 300, the system 100 may sequentially provide vendor i for i from 1 to k (with k equaling the number of vendors in the vendor list 800). In this manner, vendor 1, then vendor 2, and so on to vendor k is provided to the general trained classification model 350. In response, the general trained classification model 350 generates P1(i) for i from 1 to k (such as generating P1(1) for a financial transaction-vendor 1 pair, P1(2) for the financial transaction-vendor 2 pair, and so on to P1(k) for the financial transaction-vendor k pair).

At 604, for each entity, the system 100 generates, by a subarea trained classification model 360, a second probability of the entity matching the target object. For example, the vendors provided to the general classification model vendor are provided to one or more subarea trained classification models 360 (such as vendor i for i from 1 to k from the vendor list 800). While not depicted in FIG. 6, the system 100 may select the subarea trained classification model 360 to receive an entity and generate a P2 based on the subarea associated with the entity (such as described above with reference to block 502 depicted in FIG. 5). For example, vendor 1 from list 800 may be provided to the first subarea classification model 360-1 associated with industry A. In response, the selected subarea trained classification model 360-1 generates P2(1) for the financial transaction-vendor 1 pair. Each time a vendor i from 1 to k is provided, the system 100 may select the subarea trained classification model 360 for the industry associated with vendor i, and the selected subarea trained classification model 360 generates P2(i) for the financial transaction-vendor i pair. In this manner, P2(i) for i from 1 to k may be generated.

At 606, for each entity, the system 100 generates, by the general trained NLP model 370, a first similarity associated with the entity matching the target object. As noted above, the first similarity is depicted as P3 in the examples. For example, the vendors provided to the general classification model are provided to the general trained NLP model 370 (such as the name of vendor i for i from 1 to k from the vendor list 800). In this manner, vendor 1, then vendor 2, and so on to vendor k is provided to the general trained NLP model 370. In response, the general trained NLP model 370 generates P3(i) for i from 1 to k (such as generating P3(1) for a financial transaction-vendor 1 pair, P3(2) for the financial transaction-vendor 2 pair, and so on to P3(k) for the financial transaction-vendor k pair).

At 608, for each entity, the system 100 generates, by a subarea trained NLP model 380, a second similarity associated with the entity matching the target object. As noted above, the second similarity is depicted as P4 in the examples. For example, the vendors provided to the general classification model are provided to one or more subarea trained NLP models 380 (such as vendor i for i from 1 to k from the vendor list 800). While not depicted in FIG. 6, the system 100 may select the subarea trained NLP model 380 to receive an entity and generate a P4 based on the subarea associated with the entity (such as described above with reference to block 504 depicted in FIG. 5). For example, vendor 1 from list 800 may be provided to the first subarea NLP model 380-1 associated with industry A. In response, the selected subarea trained NLP model 380-1 generates P4(1) for the financial transaction-vendor 1 pair. Each time a vendor i from 1 to k is provided, the system 100 may select the subarea trained NLP model 380 for the industry associated with vendor i, and the selected subarea trained NLP model 380 generates P4(i) for the financial transaction-vendor i pair. In this manner, P4(i) for i from 1 to k may be generated.

At 610, the system 100 provides the first probability, the second probability, the first similarity, and the second similarity to the meta-model 390. For example, for each vendor i for i from 1 to k in the vendor list 800, the group of P1(i), P2(i), P3(i), and P4(i) is provided to the meta-model 390. At 612, for each entity, the system 100 generates, by the meta-model 390, a final probability of the entity matching the target object. To generate the final probability associated with the entity, the system 100 combines, by the meta-model 390, the first probability, the second probability, the first similarity, and the second similarity associated with the entity (614). For example, for each vendor i for i from 1 to k, the meta-model 390 may use the weighted average depicted in equation (2) above to generate PF(i) for i from 1 to k.

At 616, the system 100 compares the final probabilities associated with the plurality of entities. For example, the system 100 (such as the meta-model 390) may compare PF(i) for i from 1 to k. In some implementations, the system 100 may identify a final probability PF from all PF(i) as the highest or largest PF(i) using equation (3) depicted above.

At 618, the system 100 generates a final match of a matched entity to the target object based on the comparison. In some implementations, the matched entity is the entity(i) associated with the PF calculated using equation (3) above. For example, PF(4) for vendor 4 from list 800 may be the largest compared to all PF(i) for all vendors. As such, the system 100 may match vendor 4 to the financial transaction.

While not depicted in FIG. 6, in some implementations, the system 100 may require a match to be greater than a threshold in order to be generated as a final match. In some implementations, the system 100 compares the match generated in block 618 to a defined threshold (which, as noted above, may be any suitable threshold). For example, the system 100 compares the PF calculated by the meta-model 390 to a threshold. If the PF is less than the threshold, the system may be configured to prevent matching an entity to the target object. In this manner, a match to a specific target object (such as a specific financial transaction) may remain undefined. In some implementations, the system 100 may indicate to a user that a match is not identified for a specific target object. In this manner, a user may be able to manually generate a match to the target object. In such an indication to the user, the system 100 may indicate the closest match (such as the entity associated with the PF). The system 100 may also indicate the final probability associated with the potential match.

In some implementations of matching financial transactions and vendors (such as based on operation 600), the system 100 generates, in a ledger in memory, a money-out transaction corresponding to the financial transaction and the final vendor based on the final match. In this manner, the system 100 may automatically perform bookkeeping for any new financial transactions received by the system 100. In some implementations, the system 100 provides, to a user, a vendor recommendation of the final vendor, wherein generating the money-out transaction is based on a confirmation from the user that the final vendor is to be matched to the financial transaction. In this manner, the money-out transaction may not be generated until confirmation of the match is received from a user.

While the above description focuses on the use of a trained ensemble model to generate a match between a target object and an entity, the ensemble model is to be trained before use. For example, referring to the quad-ensemble model 300 depicted in FIG. 3, a first instance of a classification model may be trained using a first training set to generate the general trained classification model 350, a second instance of the classification model may be trained using a second training set to generate a first subarea trained classification model 360-1, a third instance of the classification model may be trained using a third training set to generate a second subarea trained classification model 360-2, and so on to generate all of the trained classification models of the quad-ensemble model 300. Similarly, different training sets may be provided to different instances of an NLP model to generate the general trained NLP model 370 and each of the subarea trained NLP models 380 of the quad-ensemble model 300. In addition, the meta-model 390 may be trained to accurately generate matches. Training of the various ML models are described below with reference to FIGS. 9-12.

Training each of the ML models and the meta-model of the ensemble model is based on supervised learning. In some implementations, a plurality of target objects are previously matched to entities. Previous matching of the entities and target objects may have been manually generated or generated by a different matching model, with the matches generated considered the desired matches between entities and target objects. For example, a user may have manually matched the last six months' worth of financial transactions with vendors. The previous matches may be labels corresponding to the financial transactions for supervised learning. While the examples herein describing training the ML models and meta-model are regarding the use case of matching financial transactions and entities for clarity, training of the models may be performed in similar manners for any suitable use case.

In some implementations, training data to be used may be limited to matches previously generated for the business to use the trained ensemble model to generate matches for one or more target objects. For example, the financial transactions and vendors associated with matches generated over the past six months (or another suitable period of time) for a specific business may be used as the training data to train the ML models and meta-model. In some other implementations, training data to be used may include matches previously generated for a plurality of businesses. For example, an online bookkeeping service may include a plurality of businesses as clients, and each business may have a user to generate matches between the business' financial transactions and vendors working with the business. If each of a plurality of businesses allows such information to be used, the aggregate of financial transactions, vendors, and generated matches over the past six months (or another suitable period of time) may be used as training data. In this manner, the trained ensemble model may be used for each business that wishes to automatically generate matches between its financial transactions and its vendors.

Figure 11:
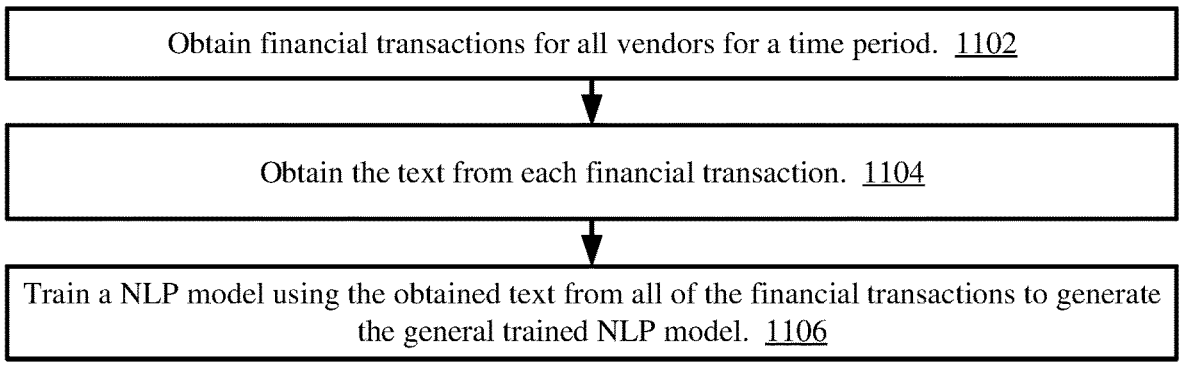
FIG. 11 shows an illustrative flow chart depicting an example operation of training a general NLP model, according to some implementations.
Figure 12:
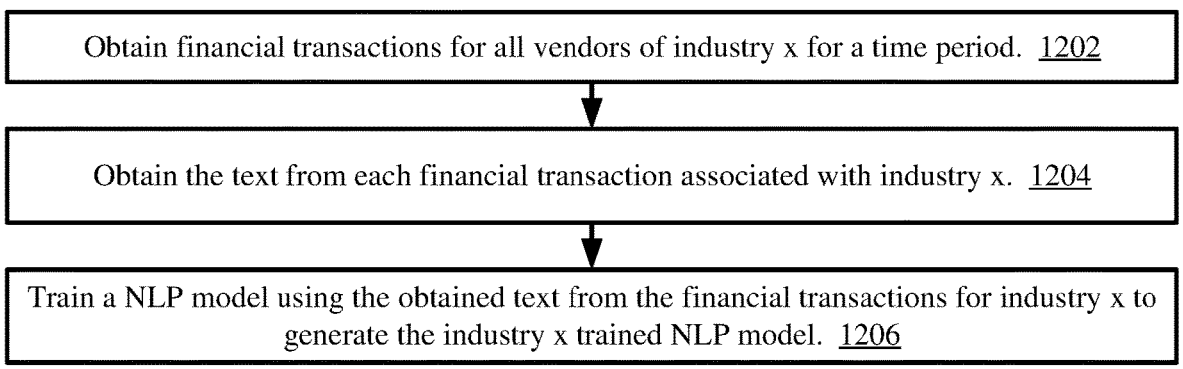
FIG. 12 shows an illustrative flow chart depicting an example operation of training a subarea NLP model, according to some implementations.

Training each type of ML model of the quad-ensemble model 300 is described below with reference to FIGS. 9-12. FIG. 9 depicts training a classification model to generate the general trained classification model. FIG. 10 depicts training a classification model to generate an industry trained classification model. FIG. 11 depicts training a NLP model to generate a general trained NLP model. FIG. 12 depicts training a NLP model to generate an industry trained NLP model.

FIG. 9 shows an illustrative flow chart depicting an example operation 900 of training a general classification model, according to some implementations. Operation 900 is described below as being performed by the system 100 to train a classification model to generate the general trained classification model 350 of a quad-ensemble model 300 for clarity. Similarly, the operation 1000 depicted in FIG. 10, the operation 1100 depicted in FIG. 11, and the operation 1200 depicted in FIG. 12 are described below as being performed by the system 100 for clarity. While system 100 is described as performing the training operations for the use case, any suitable system may train the ML models of the quad-ensemble model 300 for the desired use case. For example, another system may perform the training for online dating profile matching or any other use case, with the trained system being deployed in system 100 after training.

At 902, the system 100 obtains financial transactions for all vendors for a time period. In some implementations, the system 100 may store or may communicate with a remote database storing previous financial transactions matched for a plurality of businesses that give permission to use matching information for analytics purposes (including training of the ensemble model). The system may retrieve the stored financial transactions along with the match information indicating the vendor to which the financial transaction was matched. The match information for each financial transaction is used as a label for supervised learning, with the previous match for the financial transaction being the desired match.

The classification model may include any suitable inputs to receive defined numeric features. For example, the classification model may have a first input for a date of a financial transaction, a second input for a time of day of a financial transaction, a third input for an amount of a financial transaction, a fourth input for a character string distance between statement text and vendor name, and so on for any other numeric features that may be used to generate a match (such as a probability) by the classification model. At 904, the system 100 calculates, for each financial transaction, the numeric features to be provided to a classification ML model for training. For example, if the system 100 obtains 10,000 financial transactions at block 902, the system 100 processes each of the 10,000 financial transactions to calculate the numeric features for the financial transaction. In this manner, the system 100 generates 10,000 sets of numeric features associated with the 10,000 financial transactions.

Continuing the example of the 10,000 financial transactions, the 10,000 financial transactions are matched with a plurality of vendors associated with a plurality of industries. As such, each financial transaction (and thus the set of numeric features) is associated with a specific industry. The financial transactions (and thus the sets of numeric features) may be grouped based on industry. In this manner, a first group of financial transactions is associated with a first industry, a second group of financial transactions is associated with a second industry, and so on. For example, if the first industry is industry A in vendor list 800, the first group of financial transactions includes any financial transactions matched with vendors 1, 5, 6, and 8.

While not depicted in FIG. 9 (or in FIGS. 10-12), training data may include randomly selected financial transaction-vendor pair as negative labels (with the previously generated matches considered positive labels). In some implementations, the system 100 may generate pairs of obtained financial transactions to random vendors for the business for which the ensemble model is to be used. Each randomly generated pair is then considered a negative label for supervised learning.

At 906, the system 100 trains the classification model using the calculated numeric features for all of the financial transactions to generate the general trained classification model. To generate the general trained classification model, the training data used to train the classification model may be across industries. As such, for the above example of 10,000 sets of numeric features, all 10,000 sets may be used to train the classification model. If the system 100 also generates random pairs for at least some of the 10,000 financial transactions as negative labels, the positive labels and the negative labels associated with the 10,000 sets are used for supervised learning. As noted above, any suitable classification model may be used for training. In addition, any suitable means of supervised learning may be performed. For example, training of the classification model may be based on stochastic gradient descent, such as the Adam algorithm, for optimization of the model based on the labels.

FIG. 10 shows an illustrative flow chart depicting an example operation 1000 of training a subarea classification model, according to some implementations. Operation 1000 is described below as being performed by the system 100 to train a classification model to generate an industry x trained classification model 360 of a quad-ensemble model 300 for clarity (where x is from 1 to k for the industries of interest). If k number of industry trained classification models 360 are to be generated for the k number of industries, the system 100 may perform operation 1000 k number of iterations to train k instances of the classification model, with each iteration being associated with a different industry. For each iteration of operation 1000, the group of financial transactions used for training the associated instance of a classification model is based on the specific industry. For example, with reference to the vendor list 800, a first iteration may be for industry A, a second iteration may be for industry B, a third iteration may be for industry C, and so on. In this manner, the sets of numeric features for financial transactions matched with vendors 1, 5, 6, and 8 are used in the first iteration to train a first instance of the classification model, the sets of numeric features for financial transactions matched with vendors 2, 4, and 9 are used in the second iteration to train a second instance of the classification model, the sets of numeric features for financial transactions matched with vendors 3 and 7 are used in the third iteration to train a third instance of the classification model, and so on until the k industry trained classification models are generated.

At 1002, the system 100 obtains financial transactions for all vendors of industry x for a time period. In some implementations, the operations of block 1002 are included in the operations of block 902. For example, when the system 100 obtains the financial transactions for all vendors across all industries for the past six months, the obtained financial transactions for all vendors also includes the financial transactions for the vendors of industry x.

At 1004, the system 100 calculates, for each financial transaction, the numeric features to be provided to a classification model for training. Similar to block 1002 being part of block 902, the operations of block 1004 may be included in the operations of block 904. For example, when the system 100 calculates the 10,000 sets of numeric features for 10,000 financial transactions, the numeric features associated with the subset of financial transactions for industry x are calculated.

At 1006, the system trains the classification model using the calculated numeric features for the financial transactions for industry x to generate the industry x trained classification model. In some implementations, the classification model trained in block 1006 is an instance of the same classification model trained in block 906. For example, if a gradient boosted tree is to be trained in block 906, an instance of a generic or pre-trained gradient boosted tree (such as programmed using the XGBoost Python library) may be trained in block 906. Another instance of the same generic or pre-trained gradient boosted tree may also be trained in block 1006. In this manner, the same type of classification model is trained to generate the general trained classification model and each industry x trained classification model, with the difference between trained classification models being based on the different training data used to train each model. For example, while the sets of numeric data associated with all vendors 1-9 from vendor list 800 may be used to train the general trained classification model 350, the sets of numeric data for financial transactions matched with vendors 2, 3, 4, 7, and 9 are excluded from the training data used to train the industry A trained classification model 360. Similar to as described above with reference to operation 900, in some implementations, negative labels may also be used for supervised learning of the industry x trained classification model 360.

FIG. 11 shows an illustrative flow chart depicting an example operation 1100 of training a general NLP model, according to some implementations. Operation 1100 is described below as being performed by the system 100 to train a NLP model to generate a general trained NLP model 370 of a quad-ensemble model 300 for clarity.

At 1102, the system 100 obtains financial transactions for all vendors for a time period. The operations in block 1102 may be the same as the operations in block 902. At 1104, the system 100 obtains the text from each financial transaction. For example, the system 100 may obtain the text in the description field 702 and the memo field 704 for each financial transaction in the financial statement 700 that corresponds to a previous match (or a randomly generated pair, such as described above with reference to operations 900 and 1000). In this manner, the system 100 has the financial transaction text to be provided to a NLP model to generate a first embedding vector and various vendor names to be provided to the NLP model to generate a second embedding vector so that a similarity (such as a cosine similarity) between vectors can be calculated and analyzed in training the NLP model.

At 1106, the system 100 trains a NLP model using the obtained text from all of the financial transactions to generate the trained NLP model. To note, any suitable NLP model may be used. For example, a pre-trained BERT model may be further trained using the obtained text to generate a general trained BERT model. Training the BERT model may be based on optimizing cosine similarities between embedding vectors for financial transaction-vendor pairs based on the positive labels of previous matches (and, optionally, any generated negative labels of randomly generated pairs). Training may be supervised learning performed in any suitable manner.

FIG. 12 shows an illustrative flow chart depicting an example operation 1200 of training a subarea NLP model, according to some implementations. Operation 1200 is described below as being performed by the system 100 to train a NLP model to generate an industry x trained NLP model 380 of a quad-ensemble model 300 for clarity (where x is from 1 to k for the industries of interest). Each industry x trained NLP model 380 corresponds to the industry x trained classification model 360 such that if the industry x trained classification model 360 is selected to generate a probability of matching a vendor i to a financial transaction, the industry x trained NLP model 380 is also selected to generate a similarity indicating the likelihood of matching vendor i to the financial transaction.

If k number of industry trained NLP models 380 are to be generated for the k number of industries, the system 100 may perform operation 1200 k number of iterations to train k instances of the NLP model, with each iteration being associated with a different industry. For each iteration of operation 1200, the group of financial transactions used for training the associated instance of a NLP model is based on the specific industry. For example, with reference to the vendor list 800, a first iteration may be for industry A, a second iteration may be for industry B, a third iteration may be for industry C, and so on. In this manner, the texts for financial transactions matched with vendors 1, 5, 6, and 8 are used in the first iteration to train a first instance of the NLP model, the texts for financial transactions matched with vendors 2, 4, and 9 are used in the second iteration to train a second instance of the NLP model, the texts for financial transactions matched with vendors 3 and 7 are used in the third iteration to train a third instance of the NLP model, and so on until the k industry trained NLP models are generated.

At 1202, the system 100 obtains financial transactions for all vendors of industry x for a time period. The operations in block 1202 may be the same as the operations in block 1002 and may be performed during the operations in block 902 or 1102. At 1204, the system 100 obtains the text from each financial transaction associated with industry x. For example, the system 100 may obtain the text in the description field 702 and the memo field 704 for each financial transaction obtained in block 1202 in the financial statement 700 that corresponds to a previous match (or a randomly generated pair, such as described above with reference to operations 900 and 1000) with the matched vendor being of industry x. In this manner, the system 100 has the financial transaction text to be provided to a NLP model to generate a first embedding vector and various vendor names to be provided to the NLP model to generate a second embedding vector so that a similarity (such as a cosine similarity) between vectors can be calculated and analyzed in training the NLP model.

At 1206, the system 100 trains a NLP model using the obtained text from the financial transactions for industry x to generate the industry x trained NLP model. To note, a different instance of the same NLP model to be trained in operation 1100 may be trained in operation 1200. For example, a pre-trained BERT model may be further trained using the obtained text to generate an industry x trained BERT model that differs from the general trained BERT model based on the texts provided to the model for training. Training the BERT model may be based on optimizing cosine similarities between embedding vectors for financial transaction-vendor pairs based on the positive labels of previous matches with vendors of industry x (and, optionally, any generated negative labels of randomly generated pairs including vendors of industry x). Training may be supervised learning performed in any suitable manner.

In addition to training each of the classification models and each of the NLP models, the system 100 may also train the meta-model 390. In some implementations, if the meta-model 390 implements the weighted average depicted in equation (2) above and performs the comparison depicted in equation (3) above to generate a final match, the system 100 may use the positive labels and negative labels to train the meta-model 390, which may include adjusting the weights in the weighted average to optimize the final probabilities generated by the meta-model in order to generate the desired matches for the previous transactions used in the training data.

To note, over time and as more transactions occur, the ensemble model may generate less desired or less accurate matches. As such, the ensemble model may be retrained as necessary. For example, the system 100 may retrain the ensemble model monthly (or another suitable period of time) or in response to a user indicating that the ensemble model is to be retrained. In another example, a user may indicate whether one or more matches are inaccurate. The system 100 may retrain the ensemble model if the number of incorrect matches is greater than a threshold (such as a defined number or percentage during a period of time). In this manner, the ensemble model may remain accurate in matching target objects (such as financial transactions) and entities (such as vendors).

As described above, the system 100 (or another suitable system) may use an ensemble model to perform the operations of matching entities to target objects. As noted above, the ensemble model may be configured to any use case of a matching problem for objects or entities associated with different subareas. In addition, the ensemble model may be configured to combine classification models with NLP models to improve the accuracy of matches generated by the ensemble model. The generation of matches by such as ensemble model may be used to improve other functions, such as improving profile recommendations for online dating or performing bookkeeping for a business working with a plurality of vendors.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c, and "one or more of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations to be performed in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles, and the novel features disclosed herein.

What is claimed is:

1. A computer-implemented method for matching entities to target objects, comprising:
   obtaining a target object for matching with one of a plurality of entities;
   providing the target object to a general trained classification model of a trained ensemble machine learning (ML) model;
   generating, by the general trained classification model, a general classification based match between the target object and a first one or more entities from the plurality of entities based on the target object;
   providing the target object to a subarea trained classification model of the trained ensemble ML model;
   generating, by the subarea trained classification model, a subarea classification based match between the target object and a second one or more entities from the plurality of entities based on the target object;
   providing the target object to a general trained natural language processor (NLP) model of the trained ensemble ML model;

generating, by the general trained NLP model, a general NLP based match between the target object and a third one or more entities from the plurality of entities based on the target object;

providing the target object to a subarea trained NLP model of the trained ensemble ML model;

generating, by the subarea trained NLP model, a subarea NLP based match between the target object and a fourth one or more entities from the plurality of entities based on the target object;

providing, to a meta-model of the trained ensemble ML model, the general classification based match, the subarea classification based match, the general NLP based match, and the subarea NLP based match; and generating, by the meta-model, a final match between the target object and a final entity from the plurality of entities, wherein generating the final match is based on combining the general classification based match, the subarea classification based match, the general NLP based match, and the subarea NLP based match.

2. The method of claim 1, wherein:
the target object includes a financial transaction from a linked financial account;
the plurality of entities includes a plurality of vendors that are potential matches to the financial transaction; and
the final match includes a match between the financial transaction and a final vendor from the plurality of vendors.

3. The method of claim 2, wherein:
the plurality of vendors are associated with a plurality of industries; and
a subarea associated with the subarea trained ML model and the subarea trained NLP model includes an industry of one or more vendors from the plurality of vendors.

4. The method of claim 3, further comprising, for each of the plurality of vendors:
providing the vendor to the general trained classification model;
providing the vendor to the general trained NLP model;
selecting one of a plurality of industry trained classification models based on the industry of the vendor;
providing the vendor to the selected industry trained classification model;
selecting one of a plurality of industry trained classification models based on the industry of the vendor; and
providing the vendor to the selected industry trained classification model, wherein:
generating the general classification based match includes generating a first probability for each financial transaction-vendor pair by the general trained classification model;
generating the general NLP based match includes generating a first similarity for each financial transaction-vendor pair by the general trained NLP model;
generating the subarea classification based match includes generating a second probability for each financial transaction-vendor pair by the selected trained classification model;
generating the subarea NLP based match includes generating a second similarity for each financial transaction-vendor pair by the selected trained NLP model; and
generating the final match includes:
for each financial transaction-vendor pair, generating a final probability by combining the first probability, the second probability, the first similarity, and the second similarity;
identifying a largest probability from the plurality of final probabilities;
comparing the largest probability to a threshold; and
identifying the final vendor from the plurality of vendors to match the financial transaction based on the largest probability being greater than the threshold.

5. The method of claim 2, further comprising generating, in a ledger in memory, a money-out transaction corresponding to the financial transaction and the final vendor based on the final match.

6. The method of claim 5, further comprising providing, to a user, a vendor recommendation of the final vendor, wherein generating the money-out transaction is based on a confirmation from the user that the final vendor is to be matched to the financial transaction.

7. The method of claim 1, wherein:
the general classification based match includes, for each entity of the plurality of entities, a first probability of the entity matching the target object;
the subarea classification based match includes, for each entity of the plurality of entities, a second probability of the entity matching the target object;
the general NLP based match includes, for each entity of the plurality of entities, a first similarity associated with the entity matching the target object; and
the subarea NLP based match includes, for each entity of the plurality of entities, a second similarity associated with the entity matching the target object.

8. The method of claim 7, wherein generating the final match includes:
generating, for each entity of the plurality of entities, a final probability of the entity matching the target object, wherein generating the final probability includes combining the first probability, the second probability, the first similarity, and the second similarity; and
comparing the plurality of final probabilities generated, wherein the final match is based on the comparison.

9. The method of claim 1, further comprising:
selecting the subarea trained classification model from a plurality of subarea trained classification models of the trained ensemble ML model based on the subarea, wherein each of the plurality of subarea trained classification models is associated with a unique subarea from a plurality of subareas; and
selecting the subarea trained NLP model from a plurality of subarea trained NLP models of the trained ensemble ML model based on the subarea, wherein each of the plurality of subarea trained NLP models is associated with a unique subarea from the plurality of subareas.

10. A system for matching entities to target objects, the system comprising:
one or more processors; and
a memory storing instructions that, when executed by the one or more processors, causes the system to perform operations comprising:
obtaining a target object for matching with one of a plurality of entities;
providing the target object to a general trained classification model of a trained ensemble machine learning (ML) model;
generating, by the general trained classification model, a general classification based match between the target object and a first one or more entities from the plurality of entities based on the target object;
providing the target object to a subarea trained classification model of the trained ensemble ML model;

generating, by the subarea trained classification model, a subarea classification based match between the target object and a second one or more entities from the plurality of entities based on the target object;
providing the target object to a general trained natural language processor (NLP) model of the trained ensemble ML model;
generating, by the general trained NLP model, a general NLP based match between the target object and a third one or more entities from the plurality of entities based on the target object;
providing the target object to a subarea trained NLP model of the trained ensemble ML model;
generating, by the subarea trained NLP model, a subarea NLP based match between the target object and a fourth one or more entities from the plurality of entities based on the target object;
providing, to a meta-model of the trained ensemble ML model, the general classification based match, the subarea classification based match, the general NLP based match, and the subarea NLP based match; and
generating, by the meta-model, a final match between the target object and a final entity from the plurality of entities, wherein generating the final match is based on combining the general classification based match, the subarea classification based match, the general NLP based match, and the subarea NLP based match.

11. The system of claim 10, wherein:
the target object includes a financial transaction from a linked financial account;
the plurality of entities includes a plurality of vendors that are potential matches to the financial transaction; and
the final match includes a match between the financial transaction and a final vendor from the plurality of vendors.

12. The system of claim 11, wherein:
the plurality of vendors are associated with a plurality of industries; and
a subarea associated with the subarea trained ML model and the subarea trained NLP model includes an industry of one or more vendors from the plurality of vendors.

13. The system of claim 12, wherein the operations further comprise, for each of the plurality of vendors:
providing the vendor to the general trained classification model;
providing the vendor to the general trained NLP model;
selecting one of a plurality of industry trained classification models based on the industry of the vendor;
providing the vendor to the selected industry trained classification model;
selecting one of a plurality of industry trained classification models based on the industry of the vendor; and
providing the vendor to the selected industry trained classification model, wherein:
generating the general classification based match includes generating a first probability for each financial transaction-vendor pair by the general trained classification model;
generating the general NLP based match includes generating a first similarity for each financial transaction-vendor pair by the general trained NLP model;
generating the subarea classification based match includes generating a second probability for each financial transaction-vendor pair by the selected trained classification model;
generating the subarea NLP based match includes generating a second similarity for each financial transaction-vendor pair by the selected trained NLP model; and
generating the final match includes:
for each financial transaction-vendor pair, generating a final probability by combining the first probability, the second probability, the first similarity, and the second similarity;
identifying a largest probability from the plurality of final probabilities;
comparing the largest probability to a threshold; and
identifying the final vendor from the plurality of vendors to match the financial transaction based on the largest probability being greater than the threshold.

14. The system of claim 11, wherein the operations further comprise generating, in a ledger in the memory, a money-out transaction corresponding to the financial transaction and the final vendor based on the final match.

15. The method of claim 14, wherein the operations further comprise providing, to a user, a vendor recommendation of the final vendor, wherein generating the money-out transaction is based on a confirmation from the user that the final vendor is to be matched to the financial transaction.

16. The system of claim 10, wherein:
the general classification based match includes, for each entity of the plurality of entities, a first probability of the entity matching the target object;
the subarea classification based match includes, for each entity of the plurality of entities, a second probability of the entity matching the target object;
the general NLP based match includes, for each entity of the plurality of entities, a first similarity associated with the entity matching the target object; and
the subarea NLP based match includes, for each entity of the plurality of entities, a second similarity associated with the entity matching the target object.

17. The system of claim 16, wherein generating the final match includes:
generating, for each entity of the plurality of entities, a final probability of the entity matching the target object, wherein generating the final probability includes combining the first probability, the second probability, the first similarity, and the second similarity; and
comparing the plurality of final probabilities generated, wherein the final match is based on the comparison.

18. The system of claim 10, wherein the operations further comprise:
selecting the subarea trained classification model from a plurality of subarea trained classification models of the trained ensemble ML model based on the subarea, wherein each of the plurality of subarea trained classification models is associated with a unique subarea from a plurality of subareas; and
selecting the subarea trained NLP model from a plurality of subarea trained NLP models of the trained ensemble ML model based on the subarea, wherein each of the plurality of subarea trained NLP models is associated with a unique subarea from the plurality of subareas.

\* \* \* \* \*